(12) United States Patent
Meyerzon et al.

(10) Patent No.: US 10,545,624 B2
(45) Date of Patent: Jan. 28, 2020

(54) USER INTERFACES FOR PERSONALIZED CONTENT RECOMMENDATION

(71) Applicant: Microsoft Technology Licensing, LLC, Redmond, WA (US)

(72) Inventors: Dmitriy Meyerzon, Bellevue, WA (US); David M. Cohen, Duvall, WA (US); Adam Ford, Issaquah, WA (US); Andrew C. Haon, Seattle, WA (US); Ryan Nakhoul, Issaquah, WA (US); Jason Glenn Silvis, Bellevue, WA (US); Vidya Srinivasan, Issaquah, WA (US); Denise Trabona, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 608 days.

(21) Appl. No.: 15/075,681

(22) Filed: Mar. 21, 2016

(65) Prior Publication Data

US 2017/0269791 A1 Sep. 21, 2017

(51) Int. Cl.
*G06F 3/048* (2013.01)
*G06F 3/0481* (2013.01)
(Continued)

(52) U.S. Cl.
CPC ........ *G06F 3/0481* (2013.01); *G06F 3/04842* (2013.01); *G06F 9/451* (2018.02);
(Continued)

(58) Field of Classification Search
None
See application file for complete search history.

(56) References Cited

U.S. PATENT DOCUMENTS

| | | |
|---|---|---|
| 4,974,173 A | 11/1990 | Stefik et al. |
| 8,380,710 B1 | 2/2013 | Finne et al. |

(Continued)

FOREIGN PATENT DOCUMENTS

WO 2010025474 A2 3/2010

OTHER PUBLICATIONS

International Search Report and Written Opinion Issued in PCT Application No. PCT/US2017/022214, dated Jun. 8, 2017, 11 Pages.

(Continued)

*Primary Examiner* — Thanh T Vu
(74) *Attorney, Agent, or Firm* — Michael Best & Friedrich LLP

(57) ABSTRACT

Relevant content (e.g., containers and/or container elements) can be surfaced via user interfaces based at least partly on determining the relevant content based on interactions between user(s), container(s), and/or container element(s). Techniques described herein include generating a user interface configured with functionality to present content to a user. The user interface can include interface elements, such as cards, corresponding to containers. The cards can be arranged on the user interface in an order determined based at least partly on respective relevancies of the containers to the user, and a presentation of individual cards can be based at least partly on a type of corresponding individual containers. Individual cards can include a group of one or more interface elements corresponding to container elements that can be arranged based at least partly on respective relevancies of the container elements to the user.

19 Claims, 6 Drawing Sheets

(51) Int. Cl.
*G06F 9/451* (2018.01)
*G06F 16/248* (2019.01)
*G06F 16/2457* (2019.01)
*G06F 3/0484* (2013.01)
*H04L 29/08* (2006.01)

(52) U.S. Cl.
CPC ...... *G06F 16/248* (2019.01); *G06F 16/24578* (2019.01); *H04L 67/1095* (2013.01)

(56) References Cited

U.S. PATENT DOCUMENTS

| | | | |
|---|---|---|---|
| 8,600,968 | B2 | 12/2013 | Holenstein et al. |
| 8,983,944 | B2 | 3/2015 | Moon et al. |
| 2001/0042098 | A1 | 11/2001 | Gupta et al. |
| 2008/0040322 | A1 | 2/2008 | Rucker et al. |
| 2009/0235182 | A1 | 9/2009 | Kagawa et al. |
| 2009/0313552 | A1 | 12/2009 | Vasudevan et al. |
| 2012/0240060 | A1* | 9/2012 | Pennington ......... G06F 1/1618 715/753 |
| 2013/0179799 | A1 | 7/2013 | Savage |
| 2014/0337436 | A1* | 11/2014 | Hoagland ............. H04L 51/16 709/204 |
| 2014/0365952 | A1 | 12/2014 | Honeyman et al. |
| 2014/0372864 | A1* | 12/2014 | Zaragoza ......... G06F 17/30867 715/234 |
| 2015/0331578 | A1 | 11/2015 | Keslin et al. |

OTHER PUBLICATIONS

Adams, Paul, "Why Cards are the Future of the Web", Published on: Oct. 22, 2014, Available at: <<https://blog.intercom.io/why-cards-are-the-future-of-the-web/>>, 31 pgs.

"Add Cards to Videos", Retrieved on: Feb. 3, 2016, Available at:, <<https://support.google.com/youtube/answer/6140493?hl=en>>, 4 pgs.

Aly, et al., "Tally: Shard Selection Using the Tail of Score Distributions", In Proceedings of the 36th international ACM SIGIR conference on Research and development in information retrieval, Jul. 28, 2013, 10 pages.

Bilenko, et al., "Mining the Search Trails of Surfing Crowds: Identifying Relevant Websites From User Activity", In Proceedings of the 17th international conference on World Wide Web, Apr. 21-25, 2008, 10 pages.

Cao, Jerry, "How cards are taking over Web design", retrieved on Feb. 16, 2016, available at <http://thenextweb.com/dd/2015/06/16/how-cards-are-taking-over-web-design/#gref> The Next Web, Published Jun. 2015, 13 pages.

"Cards", Published on: Jun. 9, 2015, Available at: <<https://www.google.com/design/spec/components/cards.html#>>, 41 pgs.

Centers, Josh, "Using Content Reminders in iOS 9", Published on: Oct. 20, 2015, Available at: <<https://tidbits.com/article/16020>>, 6 pgs.

"Configure a SharePoint Site for Mobile Devices", Published on: Sep. 26, 2015, Available at: <<https://support.office.com/en-us/article/Configure-a-SharePoint-site-for-mobile-devices-ddf28727-3bfe-4b56-951d-c97204eac475>>, 4 pgs.

Corradini, et al., "AGREE Algebraic Graph Rewriting with Controlled Embedding?", In Journal of Computing Research Repository, Nov. 2014, 21 pages.

Ester, et al., "Accurate and Efficient Crawling for Relevant Websites", In Proceedings of the Thirtieth international conference on Very large data bases—vol. 30, Aug. 31, 2004, pp. 396-407.

Faulstich, Lukas C., "Using Graph Transformation Techniques for Integrating Information from the WWW", In Journal of Theory and Applications of Graph Transformations, Nov. 16, 1998, 14 pages.

Firdaus, Thoriq, "How to Add Windows Tiles to your Website", Published on: Jan. 29, 2015, Available at: <<http://webdesign.tutsplus.com/tutorials/how-to-add-windows-tiles-to-your-website--cms-23099>>, 17 pgs.

Kulkarni, et al., "Shard Ranking and Cutoff Estimation for Topically Partitioned Collections", In Proceedings of the 21st ACM international conference on Information and knowledge management, Oct. 29, 2012, 10 pages.

Kulkarni, et al., "Topic-based Index Partitions for Efficient and Effective Selective Search", In Proceedings of 8th workshop on large-scale distributed systems for information retrieval, Jul. 19, 2010, 6 pages.

"Office Delve for Office 365 admins", Published on: Mar. 21, 2015, Available at: <<https://support.office.com/en-us/article/Office-Delve-for-Office-365-admins-54f87a42-15a4-44b4-9df0-d36287d9531b>>, 6 pgs.

Pathak, et al., "A New Web Document Retrieval Method Using Extended-IOWA (Extended-Induced Ordered Weighted Averaging) Operator on HTML Tags", In IOSR Journal of Computer Engineering, vol. 16, Issue 3, May 2014, pp. 65-74.

"See or remove Now cards from apps & websites", Retrieved on: Feb. 3, 2016, Available at: <<https://support.google.com/websearch/answer/6101479?hl=en>>, 4 pgs.

Shalya, et al., "An Effective Content Based Web Page Ranking Approach", In International Journal of Engineering Science and Technology, vol. 4, Issue 8, Aug. 2012, pp. 3876-3880.

"Share Sites or Documents with People Outside your Organization", Published on: Jun. 10, 2015, Available at: <<https://support.office.com/en-us/article/Share-sites-or-documents-with-people-outside-your-organization-80e49744-e30f-44db-8d51-16661b1d4232>>, 10 pgs.

"Tile Tabs", Retrieved on: Feb. 3, 2016, Available at: <<https://addons.mozilla.org/en-US/firefox/addon/tile-tabs/>>, 15 pgs.

Zhang, et al., "Personalized Web-Document Filtering Using Reinforcement Learning", In Journal of Applied Artificial Intelligence, vol. 15, Issue 7, Aug. 1, 2001, pp. 1-17.

* cited by examiner

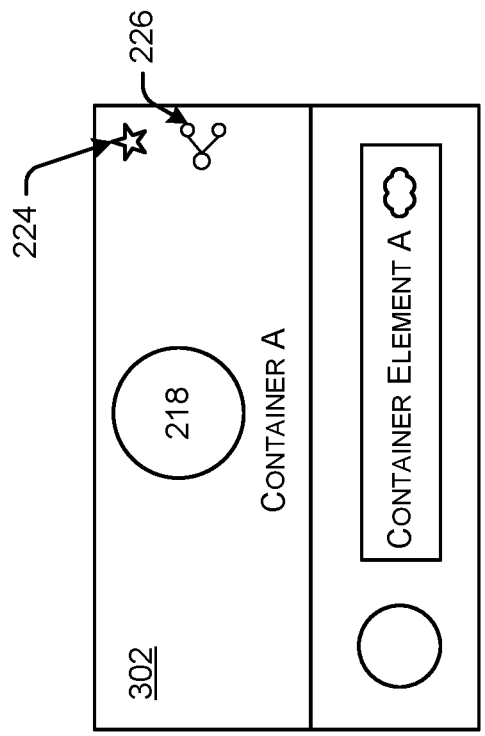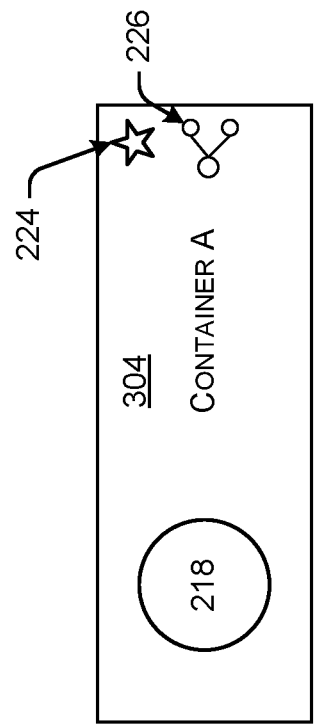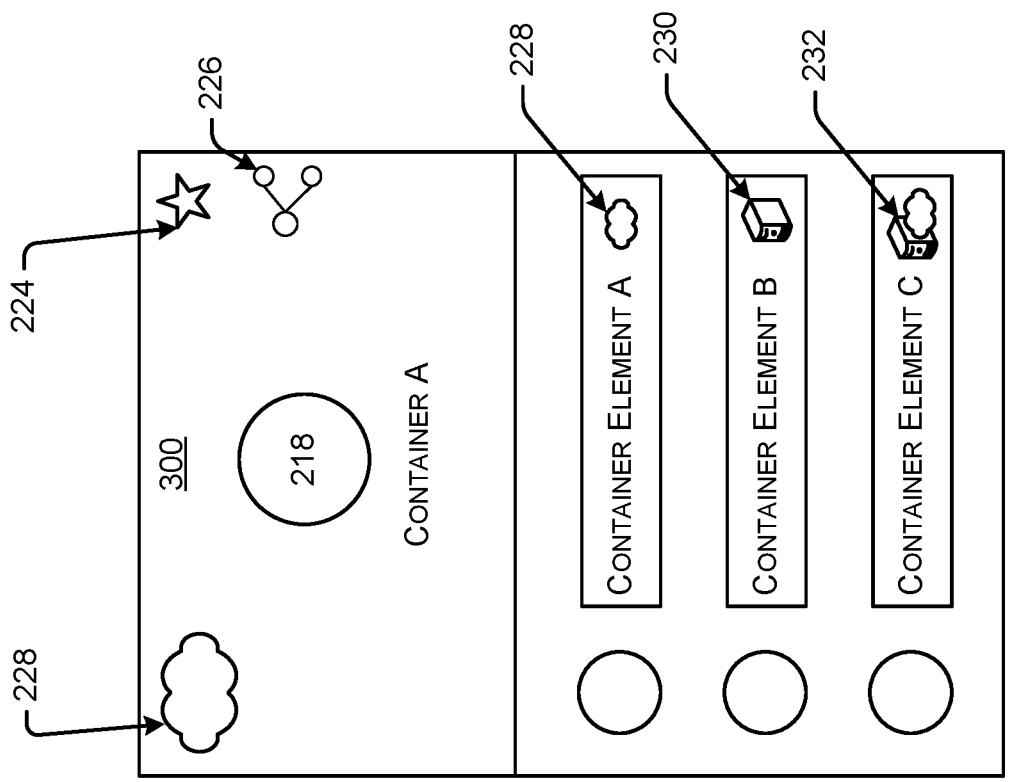

USER INTERFACES FOR PERSONALIZED CONTENT RECOMMENDATION

BACKGROUND

Data storage and processing have become major components of networked systems for handling interactions between multiple devices on behalf of corresponding users. A collaborative computing environment enables users to store files in a single network location that is accessible to other users who are a part of the collaborative computing environment. Additionally or alternatively, a collaborative computing environment enables users to sync files between the multiple devices, share files between the multiple devices, etc., and collectively work on the files that have been synced and/or shared between the multiple devices. Collaboration services that are accessible via a collaborative computing environment enable multiple users to author, edit, view, etc. various files at substantially the same time. Edits made by a user to a file can be shown to other users in the collaborative computing environment in substantially real time via the networked system. In some examples, service providers offering collaboration services (e.g., MICROSOFT® SHAREPOINT®, GOOGLE® Drive, DROPBOX®, etc.) offer a home page for a user to preview files that he or she has shared and/or synced with other users.

Current techniques organize the files on the home page by title and/or timestamp indicating when a file was uploaded, shared, modified, etc. Generally, there is little or no visual distinction between documents, and keeping track of particular files that have been shared and/or synced can be difficult. Furthermore, different files can vary in importance to a user depending on timing. For instance, a user may be working on a rush work project that is important to the user in the time leading up to the deadline associated with the rush work project. Or, a user may have worked on a project, and after several months, the project can have little or no importance to the user. Current techniques do not take importance—or relevance—into account when organizing files in content pages associated with a collaborative computing environment. That is, the lack of visual distinction and/or organization makes it difficult for users to search for files that are part of a collaborative computing environment.

SUMMARY

The techniques described herein are directed to surfacing relevant content (e.g., containers and/or container elements) via user interface(s) based at least partly on determining the relevant content from interactions between user(s), container(s), and/or container element(s). Techniques described herein include generating a user interface configured with functionality to present content to a user. The user interface can include interface elements such as graphical elements corresponding to containers. In at least one example, the graphical elements can be cards. A plurality of cards can be arranged on the user interface in an order determined based at least partly on respective relevancies the plurality of containers to the user and a presentation of an individual card of the plurality of cards can be based at least in part on a type of the corresponding individual container of the plurality of containers. In at least one example, an individual card can include a group of interface elements corresponding to container elements associated with the corresponding individual container. The techniques described herein include causing the user interface to be presented via a device associated with the user.

The techniques described herein are directed to presenting user interface(s) to user(s) that can be configured to surface content that is relevant to the user(s). In some examples, a user interface can be associated with a content page corresponding to a collaborative service environment. Based at least in part on identifying container(s) and container element(s) associated with individual container(s) that are relevant to a user, the techniques described herein can present the user with a customized content page that displays content (e.g., containers, container items, etc.) that the user is likely to be interested in accessing at a particular moment in time. The techniques described herein enable users to access content efficiently, with fewer interactions than are required for current techniques. Furthermore, the user interface(s) described herein can be configured to surface information to users via devices of various types and/or displays of various sizes without disrupting the flow of the overall layout of the user interface(s). That is, the user interface(s) described herein can provide a consistent user experience across device types that enables users to efficiently access relevant content.

This Summary is provided to introduce a selection of concepts in a simplified form that are further described below in the Detailed Description. This Summary is not intended to identify key or essential features of the claimed subject matter, nor is it intended to be used to limit the scope of the claimed subject matter.

BRIEF DESCRIPTION OF THE DRAWINGS

The Detailed Description is set forth with reference to the accompanying figures, in which the left-most digit of a reference number identifies the figure in which the reference number first appears. The use of the same reference numbers in the same or different figures indicates similar or identical items or features.

FIG. 3A is a schematic diagram that illustrates an example interface element representative of a container (e.g., a card) as described herein.

FIG. 3B is a schematic diagram that illustrates another example interface element representative of a container (e.g., a card) as described herein.

FIG. 3C is a schematic diagram that illustrates yet another example interface element representative of a container (e.g., a card) as described herein.

DETAILED DESCRIPTION

Figure 1:
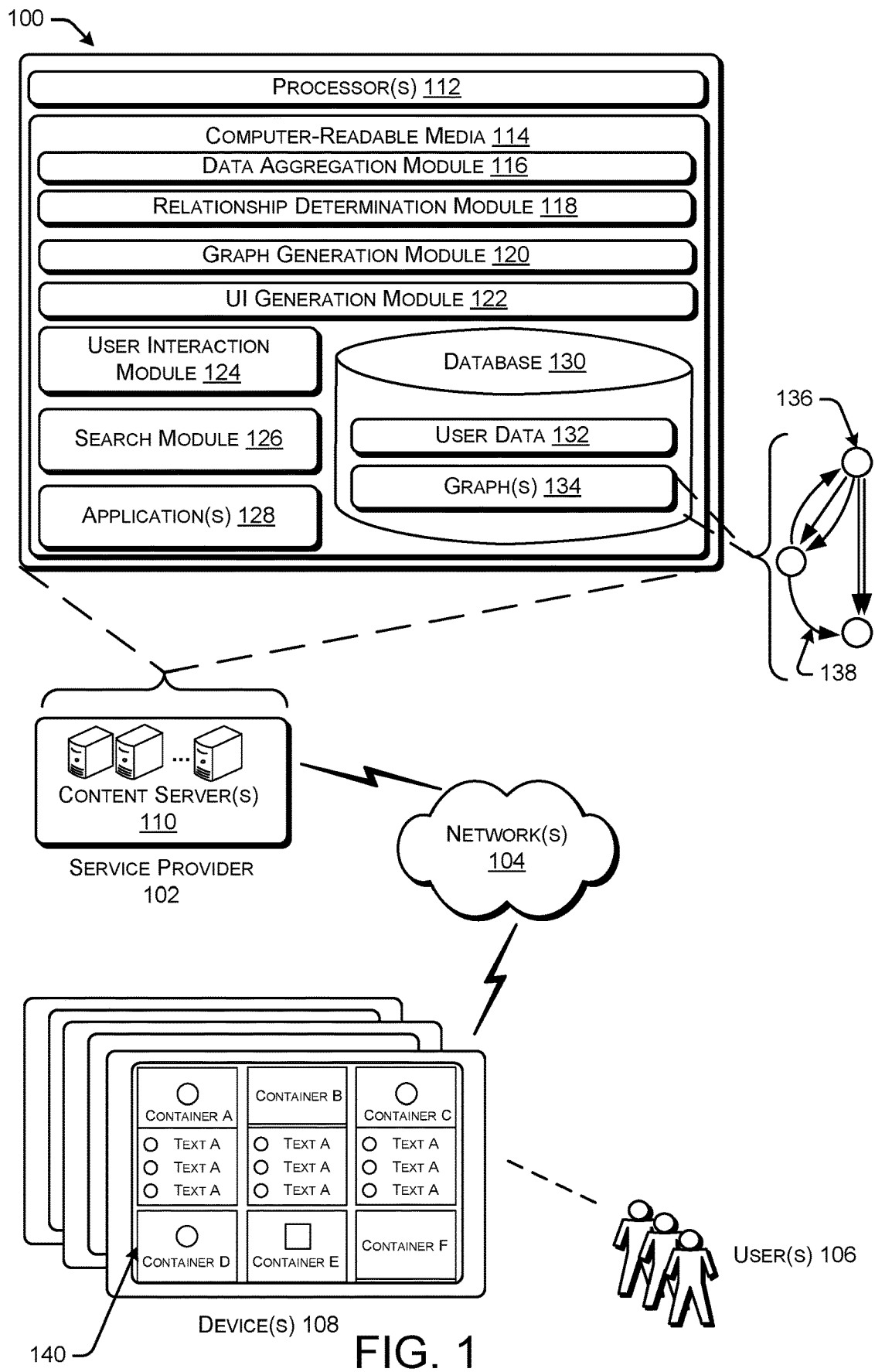
FIG. 1 is a schematic diagram showing an example environment for determining content that is relevant to user(s) based at least in part on interactions between the user(s), container(s), and/or container element(s) and surfacing relevant content via user interfaces presented via device(s) associated with the user(s).

This disclosure describes determining content that is relevant to a user based at least in part on previous interactions between user(s), container(s), and/or container element(s), and surfacing relevant content in user interfaces presented via a device corresponding to the user. In at least one example, the container(s), and associated container element(s), can be associated with a collaborative computing environment and the user interface can correspond to a content page configured to identify and/or recommend content that is relevant to individual users based on content items that a user is working on, other users that the user is working with, what those users are working on, and, in some examples, user permissions. Additionally and/or alternatively, the content page can surface content that is generally popular or trending with users of the collaborative computing environment.

For the purpose of this discussion, content can describe containers and container elements associated with the containers. In at least one example, a container is a data structure that is associated with one or more container elements. Non-limiting examples of containers include team sites, publishing sites, group sites, blogging sites, video channels, image channels, data streaming channels, folders, applications, etc. Container elements are associated with containers. Examples of container elements can include documents, wikis, blog posts, web pages, videos, images, information items, data streams, etc. As a non-limiting example, a team site container can include a plurality of container elements including documents (e.g., an article the team is collaborating on, an expense report for the team, a list of items associated with workflow, etc.), images, videos, etc. Or, a blogging site container can include a plurality of container elements that each correspond to different blog posts published (or to be published) on the blog site. A video channel container can include a plurality of container elements that each correspond to different videos that are available via the video channel.

The techniques described herein can determine access data structures that identify relationships between user(s), container(s), and/or container element(s), and can leverage the relationships to identify content (e.g., containers and container elements associated with the containers) that is relevant to user(s). For instance, the techniques described herein include determining which containers are relevant to a user based at least in part on the data structures and identified relationships. Based at least in part on determining that a container is relevant to the user, the techniques described herein include determining which container elements that are associated with the container are relevant for the user based at least in part on the identified relationships. For the purpose of this discussion, relevance can refer to the importance of a content item to a user based at least in part on what a user is working on, who a user is working with, what those users are working on, and, in some examples, user permissions. Furthermore, relevance can refer to a likelihood of a user clicking, touching, or otherwise selecting a container and/or container element to continue his or her work, discover an update, etc.

In at least one example, techniques described herein can leverage user interfaces to surface content (e.g., container(s) and associated container element(s)) that is likely to be relevant to users, and to hide content that is not likely to be relevant to the users. In some examples, a user interface can be associated with a content page corresponding to a collaborative service application (i.e., an application facilitating a collaborative computing environment). Based at least in part on identifying containers and container elements associated with individual containers that are relevant to a user, the techniques described herein can present a customized content page to the user that displays content (e.g., containers, container items, etc.) that the user is likely to be interested in accessing at a particular moment in time. The techniques described herein enable users to access content more efficiently, with fewer interactions than are required for current techniques. Based at least in part on surfacing the relevant content via customized content pages, the techniques described herein can enable users to quickly access previously started work or receive updates on new or modified content, leading to faster task completion.

The customized content page can include various interface elements. In at least one example, an interface element associated with a container can be a graphical element, such as a card. In at least one example, a card can be a substantially rectangular graphical element that communicates information to a user. A card can be a convenient means of displaying content that serves as an entry point to more detailed information. Cards associated with various containers can be organized on the content page according to respective relevancies of the cards to a user to quickly disseminate relevant information to the user. In at least one example, the cards can be associated with direct links, the activation of which can take the user to the respective containers. Additionally, individual cards can be associated with a group of one or more interface elements corresponding to container elements that are associated with respective containers. The interface elements corresponding to the container elements can be organized on the card according to respective relevancies to the user as determined herein. In at least one example, the interface elements can be associated with direct links, the activation of which can take the user to the respective container elements. Additionally, as described below, the interface elements can be associated with textual elements, graphical elements, etc. that convey information explaining why a container element is relevant to a user.

The cards described herein can be useful for providing contextual information to user(s) that helps the user(s) to identify relevant content (e.g., containers and/or container elements) and understand why the content is relevant to the user(s). The cards can be arranged in different configurations to allow content to surface based on device and/or display size without disrupting the flow of the overall layout of a user interface. For instance, the cards can be stacked vertically (e.g., an activity stream) or stacked horizontally (e.g., columns on a tablet), can be a fixed height or variable height, can be a fixed width or variable width, etc. Accordingly, the user interface(s) described herein can be configured to surface information to user(s) via devices of various types and/or displays of various sizes without disrupting the flow of the overall layout. That is, the user interface(s) described herein can provide a consistent user experience across device types that enables users to efficiently access relevant content.

In a non-limiting example, a group of employees can be associated with a same team. A first team member can generate a team site (i.e., a container) for the team and can share the team site with the other team members via a collaborative computing environment. Other team members can add documents, videos, images, information items, etc. (i.e., container elements) to the team site. All of the team members can view, edit, share, tag, etc. each of the documents, videos, images, information items, etc. associated with the team site, according to permissions. The techniques described herein can be leveraged to identify content items (e.g., documents, videos, images, information items, etc.) that are relevant to each of the team members based at least in part on interactions between the team members, the team site, and the documents, videos, images, information items, etc. associated with the team site. For instance, a content page associated with the collaborative computing environment can include a graphical element representative of the team site. In some examples, as described above, the graphical element can be a card. The graphical element can correspond to a direct link to the team site. Additionally, a group of one or more interface elements representative of various container elements (e.g., documents, videos, images, information items, etc.) can be associated with the card. The group of interface elements can correspond to direct links to container elements with relevant recent activity or a list of tasks for the team to complete. The interface elements corresponding to the container elements can be organized on the card according to relevance. Based at least in part on surfacing the relevant content via a customized content page, the techniques described herein can enable the team members to quickly access previously started work and/or observe what other team members are doing, leading to collaborative task completion.

Illustrative Environments

FIG. 1 is a schematic diagram showing an example environment 100 for determining content that is relevant to user(s) based at least in part on interactions between the user(s), container(s), and/or container element(s), and surfacing relevant content via user interfaces presented via device(s) associated with the user(s). More particularly, the example environment 100 can include a service provider 102, network(s) 104, user(s) 106, and device(s) 108 associated with individual ones of the user(s) 106.

The service provider 102 can be any entity, server(s), platform, etc., that facilitates determining content that is relevant to user(s) 106 based at least in part on interactions between the user(s) 106, container(s), and/or container element(s), and surfacing the relevant content via user interfaces as described herein. In at least one example, the service provider 102 can be associated with providing collaboration services. As described above, collaboration services available via a collaborative computing environment enable multiple users 106 to author, edit, view, etc., various files at substantially the same time so that other users 106 can access newly added files and/or recently updated files in substantially real time. The service provider 102 can be implemented in a non-distributed computing environment or can be implemented in a distributed computing environment, possibly by running some modules on remotely located devices (e.g., device(s) 108). As shown, the service provider 102 can include one or more servers 110, which can include one or more processing units 112 and computer-readable media 114, such as memory.

In various examples, the service provider 102 can access data associated with interactions between user(s) 106, container(s), and/or container element(s). In at least one example, the service provider 102 can aggregate the data to determine relationships between user(s) 106, container(s), and/or container element(s). The service provider 102 can leverage the relationships to generate data structures that represent relationships between user(s) 106, container(s), and/or container element(s). The service provider 102 can leverage the data structures to identify content (e.g., container(s) and/or container element(s)) that is relevant to user(s) 106 to surface via device(s) 108 corresponding to the user(s) 106, and can generate user interfaces customized for particular user(s) 106 based at least in part on the content that is determined to be relevant to the particular user(s) 106. Additionally and/or alternatively, in some examples, the service provider 102 can utilize the data structures to generate results responsive to queries associated with the container(s) and/or container element(s) to accommodate a search associated with the collaborative services offered by service provider 102.

In some examples, the network(s) 104 can be any type of network known in the art, such as the Internet. Moreover, the server(s) 110 and/or the device(s) 108 can communicatively couple to the network(s) 104 in any manner, such as by a global or local wired or wireless connection (e.g., local area network (LAN), intranet, etc.). The network(s) 104 can facilitate communication between the server(s) 110 and the device(s) 108 associated with the user(s) 106.

Examples support scenarios where device(s) that can be included in the one or more servers 110 can include one or more computing devices that operate in a cluster or other configuration to share resources, balance load, increase performance, provide fail-over support or redundancy, or for other purposes. Device(s) included in the one or more servers 110 can represent, but are not limited to, desktop computers, server computers, web-server computers, personal computers, mobile computers, laptop computers, tablet computers, wearable computers, implanted computing devices, telecommunication devices, automotive computers, network enabled televisions, thin clients, terminals, game consoles, gaming devices, work stations, media players, digital video recorders (DVRs), set-top boxes, cameras, integrated components for inclusion in a computing device, appliances, or any other sort of computing device. That is, device(s) that can be included in the one or more servers 110 can include any type of computing device having one or more processing units (e.g., processor(s) 112) operably connected to computer-readable media 114 such as via a bus, which in some instances can include one or more of a system bus, a data bus, an address bus, a PCI bus, a Mini-PCI bus, and any variety of local, peripheral, and/or independent buses. In at least one configuration, the computer-readable media 114 of the server(s) 110 can include module(s) that facilitate determining relevant content for user(s) 106. The module(s) can include a data aggregation module 116, a relationship determination module 118, a graph generation module 120, a user interface (UI) generation module 122, a user interaction module 124, and a search module 126. Additionally, the computer-readable media 114 can include application(s) 128 and a database 130. The database 130 can store user data 132 and data structures, such as graph(s) 134.

Alternatively, or in addition, the functionality described herein can be performed, at least in part, by one or more hardware logic components such as accelerators. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip Systems (SOCs), Complex Programmable Logic Devices (CPLDs), etc. Device(s) that can be included in the one or more server(s) 110 can further include one or more input/output (I/O) interface(s) coupled to the bus to allow device(s) to communicate with other devices such as input peripheral devices (e.g., a keyboard, a mouse, a pen, a game controller, a voice input device, a touch input device, gestural input device, and the like) and/or output peripheral devices (e.g., a display, a printer, audio speakers, a haptic output, and the like). Such network interface(s) can include one or more network interface controllers (NICs) or other types of transceiver devices to send and receive communications over a network. For simplicity, some components are omitted from the illustrated environment.

Processing unit(s) (e.g., processor(s) 112) can represent, for example, a CPU-type processing unit, a GPU-type processing unit, a Field-Programmable Gate Array (FPGA), another class of Digital Signal Processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-Chip systems (SOCs), Complex Programmable Logic Devices (CPLDs), etc. In various examples, the processing unit(s) (e.g., processor(s) 112) can execute one or more modules and/or processes to cause the server(s) 110 to perform a variety of functions, as set forth above and explained in further detail in the following disclosure. Additionally, each of the processing unit(s) (e.g., processor(s) 112) can possess its own local memory, which also can store program modules, program data, and/or one or more operating systems.

As described above, in at least one configuration, the computer-readable media 114 of the server(s) 110 can include module(s) that facilitate determining relevant content for user(s) 106 and generating user interface(s) to surface the relevant content to the user(s) 106. The module(s) can represent pieces of code executing on a computing device. In some examples, a module can include an Application Program Interface (API) to perform some or all of its functionality (e.g., operations). In additional and/or alternative examples, the module(s) can be implemented as computer-readable instructions, various data structures, and so forth via at least one processing unit (e.g., processor(s) 112) to configure a device to execute instructions and to perform operations for determining content that is relevant to user(s) 106 and surfacing the relevant content via user interfaces presented to the user(s) 106. Functionality to perform these operations can be included in multiple devices or a single device.

The data aggregation module 116 can aggregate data associated with interactions between user(s) 106, container(s), and/or container element(s). The data aggregation module 116 can receive, access, or determine data from local storage associated with the device(s) 108 and/or service provider 102 (e.g., user data 132), remote storage repositories associated with the device(s) 108 and/or the service provider 102, and/or third party sources or systems. The data can indicate interactions between user(s) 106, container(s), and/or container element(s). For instance, the data can indicate a container with which a user 106 interacts, how the user 106 interacts with the container, and a time associated with the interaction (e.g., timestamp). In at least one example, the data can indicate that a container has been generated by a user 106, a container and/or a home page associated with a container has been viewed by a user 106, a container has been shared by a user 106, a container has been followed by a user 106, a container has been tagged by a user 106, a container has been modified by a user 106, etc. In at least one example, an interaction between a user 106 and a container element associated with a container can generate data indicating that the user 106 interacted with the container. As described above, the data can identify a container which has received an interaction, an action associated with the interaction (e.g., view, edit, share, comment, etc.), the actor (e.g., which user 106 performed the action), a timestamp associated with the interaction, etc. For the purpose of this discussion, the timestamp can reflect actual time (e.g., hour, minute, second, etc.) or relative time (e.g., one second ago, one minute ago, one week ago, etc.).

As a non-limiting example, the data can indicate that a user 106 interacted with a team site container that is associated with a plurality of container elements. The team site container can be associated with a plurality of users 106 who are part of a team are working on the plurality of container elements collaboratively. Or, the data can indicate that a user 106 interacted with a blogging site that is associated with a plurality of container elements that each correspond to different blog posts.

In some examples, the data can indicate user actions corresponding to container elements that are associated with individual containers. In at least one example, the data can identify a container element that was generated by a user 106, has been uploaded by the user 106, has been shared by a user 106, has been followed by a user 106, etc. In some examples, the data can indicate a container element that has been viewed by a user 106, edited by a user 106, reviewed by a user 106, commented on by a user 106, tagged by a user 106, etc. In additional and/or alternative examples, the data can indicate that a container element has been send as a link or attachment in a message, presented in a meeting, etc. The data can identify a container element which has received an interaction, an action associated with the interaction (e.g., view, edit, share, comment, etc.), the actor (e.g., which user 106 performed the action), a timestamp associated with the interaction, etc. For the purpose of this discussion, the timestamp can reflect actual time (e.g., hour, minute, second, etc.) or relative time (e.g., one second ago, one minute ago, one week ago, etc.), as described above.

As a non-limiting example, the data can indicate that a user 106 uploaded a document into a team site container and the user 106 modified a document associated with the team site container. Or, the data can indicate that a user 106 uploaded a document into a team site container and another user 106 who is a member of the team edited a document associated with the team site container generated by the user 106.

Furthermore, the data can identify other users 106 with whom the user 106 is associated and/or interacts. In at least one example, the data can be associated with emails sent or received from user(s) 106, calendar invitations associated with user(s) 106, social networking contacts associated with user(s) 106, etc. The data associated with the emails can indicate other users 106 that send or receive emails associated with a user 106. Or, data associated with calendar invitations can indicate other users 106 who were invited to and/or participated in a meeting associated with a user 106. Moreover, social networks can provide lists of users 106 who are in contact with a user 106, and in some examples strengths associated with relationships between users 106. A non-limiting example of a social network can include an office graph network, etc. Additional and/or alternative data can be used for identifying relationships between users 106. In at least one example, the data can identify other users 106 who are organizationally related to a user 106 (e.g., coworkers, team members, etc.). In additional and/or alternative examples, the data can identify other users 106 who are socially related to the user 106 (e.g., family, friends, etc.).

In at least one example, the data can indicate permissions data associated with user(s) 106, container(s), and/or container element(s). The permissions data can identify user(s) 106 that are permitted to access particular containers and/or container elements, etc.

The data can be stored in the user data 132 of the database 130 in a user profile associated with each user 106. In at least one example, the data aggregation module 116 can access the data that is stored in the user data 132 at a particular frequency, after a lapse in a period of time, after an occurrence of a particular event (e.g., accessing, receiving, determining new data, etc.), etc.

In some examples, the data aggregation module 116 can access, receive, and/or determine data associated with public sources. However, in other examples, the data aggregation module 116 can access, receive, and/or determine data associated with private sources that are not accessible to the public. In such examples (i.e., when the data sources are private sources and/or the data is associated with personally identifiable information (PII)), the systems and methods described herein may not proceed without first obtaining permission from the user(s) 106 associated with the data. In such examples, a user 106 can be provided with notice that the systems and methods herein are collecting PII. Additionally, prior to initiating PII data collection, users can have an opportunity to opt-in or opt-out of the PII data collection. For example, a user can opt-in to the PII data collection by taking affirmative action indicating that he or she consents to the PII data collection. Alternatively, a user can be presented with an option to opt-out of the PII data collection. An opt-out option can require an affirmative action to opt-out of the PII data collection, and in the absence of affirmative user action to opt-out, PII data collection can be impliedly permitted.

The relationship determination module 118 can determine relationships between user(s) 106, container(s), and/or container element(s) based at least in part on processing data aggregated by the data aggregation module 116. In at least one example, the relationship determination module 118 can determine containers followed by individual users 106. For the purpose of this discussion, a user 106 following a container can have a similar effect as a user 106 indicating that a container is a favorite container. In additional and/or alternative examples, the relationship determination module 118 can determine containers that are frequently accessed by a user 106. That is, the relationship determination module 118 can determine containers that a user 106 visits, interacts with, etc. a number of times above a threshold, at a rate above a threshold, etc. In at least one example, the relationship determination module 118 can determine containers that have been recently accessed by a user 106 based on a timestamp associated with an interaction. Furthermore, in at least one example, the relationship determination module 118 can determine containers that are frequently accessed by other users 106 associated with a user 106. That is, in some examples, the relationship determination module 118 can determine containers that users 106 who are associated with the user 106 have interacted with, without regard to whether the user 106 has interacted with the containers. Based at least in part on determining interactions between user(s) 106 and container(s), the relationship determination module 118 can determine or infer relationships between the user(s) 106 and the container(s). Additionally and/or alternatively, the relationship determination module 118 can leverage interactions between user(s) 106 and container element(s) associated with the container(s) to determine or infer relationships between the user(s) 106 and the container(s).

Additionally and or alternatively, the relationship determination module 118 can determine relationships between user(s) 106 and container element(s) based at least in part on determining interactions between user(s) 106 and container element(s). In at least one example, the relationship determination module 118 can determine container elements followed, tagged, edited, shared, viewed, etc. by individual users 106. In additional and/or alternative examples, the relationship determination module 118 can determine container elements that are frequently accessed by a user 106. That is, the relationship determination module 118 can determine container elements that a user 106 visits, interacts with, etc. a number of times above a threshold, at a rate above a threshold, etc. In at least one example, the relationship determination module 118 can determine container elements that have been recently accessed by a user 106 based on a timestamp associated with an interaction. Furthermore, in at least one example, the relationship determination module 118 can determine container elements that are frequently accessed by other users 106 associated with a user 106 and/or other users 106 who are a part of a collaborative computing environment. That is, in some examples, the relationship determination module 118 can determine container elements that users 106 who are associated with the user 106 have interacted with, without regard to whether the user 106 has interacted with the container elements. Based at least in part on determining interactions between user(s) 106 and container element(s), the relationship determination module 118 can determine or infer relationships between the user(s) 106 and the container element(s).

In at least one example, the relationship determination module 118 can determine weights associated with relationships between user(s) 106, container(s), and/or container element(s). The weights can represent a strength of a relationship between a user 106, a container, and/or a container element. In at least one example, the weights can be based at least in part on a frequency and/or regularity of interaction(s), a recency of interaction(s), etc. That is, a container with which a user 106 frequently interacts can have a higher weight than a container with which the user 106 does not frequently interact. Or, a container element that is frequently and/or regularly interacted with can have a higher weight than a container element that is infrequently and/or not regularly interacted with. Or, in a non-limiting example, a container with which a user 106 interacted with an hour ago can have a higher weight than a container with which a user 106 interacted with several days ago. In at least one example, the weight can correspond to relevance.

In at least one example, a relationship can be associated with one or more interactions between a user 106 and a same container and/or container element. Each interaction of the one or more interactions can be associated with a weight. In some examples, weights associated with each of the interactions can be combined to determine the weight associated with the relationship.

In some examples, a weight can be based at least in part on a timestamp. For instance, a recent interaction can have a higher weight than a less recent interaction (i.e., the weight decreases over time). As a non-limiting example, the relationship determination module 118 can assign a weight closer to one to an interaction that occurred minutes ago and a weight closer to zero to an interaction that occurred weeks or months ago. In other examples, a weight can be based at least in part on the action associated with the interaction. For instance, particular actions performed on or associated with a container element can indicate that a user 106 is more interested in that container element than another container element associated with a different action. As a non-limiting example, an action where a user 106 authored, uploaded, shared, or edited a container element can have a higher weight (e.g., closer to one) than an action where a user 106 viewed a container element (e.g., closer to zero).

In at least one example, the weights associated with the actions can be determined using machine learning algorithms. Machine learning algorithms can include supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc. The machine learning algorithms can access data associated with the user(s) 106 (e.g., user data 132) identifying with interactions between user(s) 106, container(s), and/or container element(s). The machine learning algorithms can learn which actions lead to a user 106 returning to a container element in a shortest amount of time. Such actions can be associated with a highest weight (e.g., closer to one). The machine learning algorithms can also learn which actions lead to a user 106 slowly returning to a container element (e.g., in an amount of time outside of a predetermined range or threshold), or never returning to the container element. Such actions can be associated with a lowest weight (e.g., closer to zero).

In some examples, a weight can be based at least in part on a timestamp and an action. For instance, the weight can be a sum of the weight associated with the timestamp and the weight associated with the action. Or, the weight can be an average (mean), median, mode, or other measure of central tendency, or another computation associated with the weights associated with the timestamp and the action. In other examples, the timestamp weight or the weight associated with the action can be weighted more than the other weight. For instance, in some examples, a weight associated with a timestamp can affect the weight associated with the interaction more than a weight associated with the action. In at least one example, machine learning algorithms can be used to determine the weights associated with each interaction, as described above.

As described above, in at least one example, a relationship can be associated with two or more interactions between a same user 106, container, and/or container element. That is, a relationship between a user 106 and a container can be associated with two or more interactions between the user 106 and the container. In some examples, the relationship determination module 118 can leverage the weights determined for each interaction between the same user 106, container, and/or container element to determine the weight associated with the relationship. In some examples, the weight associated with the relationship can be a sum of weights associated with each interaction. In other examples, the weight associated with the relationship can be an average (mean), median, mode, or other measure of central tendency of the weights associated with each interaction. Additional and/or alternative computations can be used to determine the weight of the relationship based at least in part on the weights associated with each of the individual interactions.

A non-limiting example of an equation that can be used to determine a weight based on timestamp(s) and action(s) associated with one or more interactions is shown below in EQUATION 1. In EQUATION 1, $\lambda'_{ud}$ can represent the weight of relationship between a user u and a container element d. In such examples, $\lambda_{ud}$ can estimate a rate of interaction between the user u and the container element d. $\beta^\tau$ can represent a time decay factor (i.e., how much the rate of interaction decreases during a time $\tau$). $v_a$ can represent the weight of the action associated with the interaction (e.g., view, edit, tag, share, etc.). $c_{aud}$ can represent a number of interactions of type a between a user u and a container element d in a given a time $\tau$.

$$\lambda'_{ud} = \beta^\tau \lambda_{ud} + (1 - \beta^\tau) \sum_a v_a \frac{c_{aud}}{\tau} \qquad \text{EQUATION 1}$$

The graph generation module 120 can generate data structures for representing relationships determined by the relationship determination module 118. In at least one example, a data structure can be a graph. A graph can include a plurality of objects, each representing a user 106, a container, or a container element. In at least one example, the objects can be nodes, vertices, or points. A non-limiting example of an object 136 is shown in FIG. 1. Individual objects of the plurality of objects can be connected by edges. Edges are lines, arcs, branches, etc. that connect two objects. A non-limiting example of an edge 138 is shown in FIG. 1. Each object can have any number of edges connecting it to one or more other objects. Each of the edges can be associated with a weight corresponding to the relationship represented by the edge. Additionally and/or alternatively, a data structure can be a matrix or any other data structure that can visually depict relationships between user(s) 106, container(s), and/or container element(s). The data structures can be stored in the database 130. In FIG. 1, graph(s) 134 are shown in the database 130.

As described above, in at least one example, the data aggregation module 116 can access the data that is stored in the user data 132 at a particular frequency, after a lapse in a period of time, after an occurrence of a particular event (e.g., accessing, receiving, determining new data, etc.), etc. Based at least in part on accessing updated data, the graph generation module 120 can update the data structure (e.g., graph 134) to reflect the changes based on the updated data.

The UI generation module 122 can generate one or more user interfaces for surfacing relevant content to user(s) 106. In at least one example, the UI generation module 122 can access data structure(s) (e.g., graph(s) 134) to determine a number of relevant container(s) based at least in part on the data structure(s). In at least one example, the UI generation module 122 can identify an object associated with a user 106. The UI generation module 122 can identify the relationships between the user 106 and container(s) via transitive closure of the graph. That is, the UI generation module 122 can determine other objects that correspond to container(s) that are reachable from the object associated with the user 106 via an edge. Based at least in part on identifying container(s) with which a user 106 has a relationship, the UI generation module 122 can leverage weights associated with identified relationships to determine which of the container(s) are relevant to the user 106. In at least one example, the one or more containers that are relevant to the user 106 can be container(s) associated with relationships having highest ranking weights or weights above a threshold weight.

In some examples, the UI generation module 122 can determine that a user 106 does not have a relationship with enough containers to fulfill the number of containers desired by the UI generation module 122. For instance, a user 106 can be a new user and may not have interacted with any containers. Or, a user 106 can be a user 106 that does not regularly use the collaborative computing environment. As a result, the user 106 may have relationships with fewer containers than the number desired by the UI generation module 122. In such examples, the UI generation module 122 can fall back to containers that are relevant to user(s) 106 that are associated with the user 106, containers that are relevant to user(s) 106 who are part of a same team and/or a same tenant (e.g., business), containers that are relevant to all user(s) 106, respectively. The UI generation module 122 can determine the fall back containers leveraging weights associated with relationships corresponding to the containers, as described above. In some examples, the UI generation module 122 can integrate the fall back containers into a same portion of a user interface as the most relevant containers described above. In other examples, the UI generation module 122 can determine the fall back containers to be suggested containers, as described below.

Additionally and/or alternatively, in an example, the UI generation module 122 can determine a number of relevant container elements associated with each container. In such an example, the UI generation module 122 can access data structures (e.g., graph(s) 134) to determine relationships between a user 106, container(s), and/or container element(s). In at least one example, the UI generation module 122 can identify an object associated with a user 106. The UI generation module 122 can identify the relationships between the user 106 and container element(s) via transitive closure of the graph. In at least one example, the UI generation module 122 can determine a relevant container and one or more container elements that are related to the relevant container. Then, the UI generation module 122 can make a transitive closure along edges between the user 106 and the container and the container and the one or more container elements. That is, the UI generation module 122 can determine other objects that correspond to container element(s) that are reachable from the object associated with the user 106 via one or more edges. Based at least in part on identifying container element(s) with which a user 106 has a relationship, the UI generation module 122 can leverage weights associated with identified relationships to determine which of the container element(s) are relevant to the user 106. In at least one example, the one or more container elements that are relevant to the user 106 can be container element(s) associated with relationships associated with highest ranking weights or weights above a threshold weight.

In at least one example, the most relevant container elements may be container elements associated with relationships corresponding to the user 106 with highest weights or weights above a threshold weight. In at least one example, a weight corresponding to a relationship between a user 106 and a container element can be used to determine a position of an interface element representing the container element on a card. However, in additional and/or alternative examples, a weight corresponding to an interaction associated with the relationship (e.g., a weight used to determine the weight of the relationship) can be used to determine which interaction to surface in association with interface element on the card. In at least one example, an interaction with a highest weight can be surfaced. Or, an interaction above a threshold weight can be surfaced. In at least one example, the interaction can be surfaced based at least in part on determining that a threshold number of users 106 had the same interaction with the interface element. In some examples, an interaction that has a highest weight, is above a threshold weight, etc. may not be surfaced based at least in part on permissions indicating that particular users 106 are not permitted to view or have knowledge of such interactions.

In some examples, the UI generation module 122 can determine that a user 106 does not have relationships with enough container elements within a container to fulfill the number of container elements desired by the UI generation module 122. For instance, a user 106 can be a new user and may not have interacted with any container elements. Or, a user 106 can be a user 106 that does not regularly use the collaborative computing environment. As a result, the user 106 may have relationships with fewer container elements than the number desired by the UI generation module 122. In such examples, the UI generation module 122 can fall back to container elements that are relevant to user(s) 106 that are associated with the user 106, container elements that are relevant to user(s) 106 who are part of a same team and/or a same tenant (e.g., business), container elements that are relevant to all user(s) 106, respectively. The UI generation module 122 can determine the fall back container elements leveraging weights associated with relationships corresponding to the container elements, as described above. In some examples, the UI generation module 122 can integrate the fall back container elements into a same portion of a user interface as the most relevant container elements described above. In other examples, the UI generation module 122 can determine that the fall back container elements are suggested container elements, as described below.

In an example, the user interface(s) can be configured to present interface elements representative of containers and container elements via a content page associated with an application 128 (e.g., a collaborative service application). A non-limiting example of a content page 140 is illustrated in FIG. 1. In at least one example, the content page may be a content feed configured to present user(s) 106 with frequently updated content. In some examples, the UI generation module 122 can update the content in the content page at a particular frequency, after a lapse in a period of time, after an occurrence of a particular event, etc. For instance, the UI generation module 122 can update the content in the content page based at least in part on determining that the user data 132 has been updated, determining that a user 106 logged in to the collaboration services application, determining that a user 106 returned to the content page, etc. In at least one example, the UI generation module 122 can push updates to the content page at a particular frequency, after a lapse in a period of time, after an occurrence of a particular event, etc. The user interface(s) can provide a user 106 with content corresponding to containers and/or container elements that the user 106 is likely going to want to access at a particular moment in time, as described above. In additional and/or alternative examples, the user interface(s) can include additional and/or alternative content such as images, videos, messages, widgets, etc. Examples of a user interface and various user interface components are illustrated and disclosed in FIGS. 2, 3A-C, and 4A-B, below.

The user interaction module 124 can determine interactions between user(s) 106 and user interface(s). In at least one example, a user 106 can interact with the user interface(s) via input peripheral devices (e.g., a keyboard, a mouse, a pen, a game controller, a voice input device, a touch input device, gestural input device, and the like). In some examples, a user 106 can interact with the user interface(s) by touch interaction, scrolling interaction (e.g., scroll to the left, scroll to the right, scroll up, scroll down, etc.), etc. For instance, a user 106 can perform a gesture associated with a scrolling functionality to access additional content that may not be visible on a portion of a user interface that is presented to the user 106. Or a user 106 can actuate a control (e.g., a hyperlink or overlay) on the user interface that corresponds to a container or a container element to launch the container home page or take the user 106 to the location of the container element, respectively. The user 106 can actuate the control by clicking, touching, or otherwise selecting the control. Furthermore, in additional and/or alternative examples, the user 106 can interact with the user interface by actuating a control corresponding to a call to action (e.g., share, follow, send in message, etc.). The user interaction module 124 can receive data identifying a user interaction with a user interface and can cause a corresponding functionality to be performed via the user interface.

The search module 126 can be configured to receive queries from device(s) 108 associated with user(s) and return results responsive to the queries. In at least one example, the user interface can provide a search function for user(s) 106 to locate container(s), container element(s), other user(s) 106, etc. that are associated with a collaborative computing environment. In some examples, the queries can be associated with container(s) and/or container element(s). In other examples, the queries can be associated with users 106.

In at least one example, the search module 126 can access the database 130 to access data structures, such as graph(s) 134. The search module 126 can leverage data associated with the graph(s) 134 to generate a result (e.g., search result) responsive to the query (e.g., search query). The search module 126 can locate an object associated with a graph that represents the user 106. In at least one example, the search module 126 can identify the relationships between the user 106 and container(s) and/or container element(s) via transitive closure of the graph. That is, the search module 126 can determine other objects that correspond to container(s) and/or container element(s) that are reachable from the object associated with the user 106 via an edge. The search module 126 can compare data associated with the query with data associated with each of the container(s) and/or container element(s) identified by the transitive closure of the graph. The search module 126 can determine that a container and/or a container element are substantially similar to the query based at least in part on determining that a similarity metric comparing the container and/or the container element to the query is above a threshold value or within a range of values indicative of similarity. The search module 126 can generate a result based at least in part on container(s) and/or container element(s) that are determined to be substantially similar to the query. In some examples, more than one container and/or container element can be associated with a similarity metric that is above the threshold value or within the range of values. In such examples, a top ranking container and/or container element can be selected for the result.

The search module 126 can send the result to the UI generation module 122. In at least one example, the UI generation module 122 can integrate the result into a user interface, as described below. As described above, the result can be associated with a container, container element, and/or user 106 that is associated with the collaborative computing environment.

As described above, in at least one configuration, the computer-readable media 114 of the server(s) 110 can include application(s) 128. The application(s) 128 can represent pieces of code executing on a computing device. The application(s) 128 can be built into a device (e.g., telecommunication, text message, clock, camera, etc.) or can be customized (e.g., games, news, transportation schedules, online shopping, etc.). The application(s) 128 can comprise any type of application that can facilitate collaboration between users 106 in a collaborative computing environment, such as a content sharing application, a content synching application, or any other type of application.

In at least some examples, the application(s) 128 can be implemented as computer-readable instructions, various data structures, and so forth via at least one processing unit (e.g., processor(s) 112) to configure a device to execute instructions and to perform operations for generating user interface(s) for individual application(s) 128 that can be presented to user(s) 106 via device(s) 108 associated with the user(s) 106. In at least one example, the application(s) 128 can perform same or similar functions as the UI generation module 122, the user interaction module 124, and/or the search module 126, as described above.

The database 130 can store data that is organized so that it can be accessed, managed, and updated. In at least one example, the database 130 can store user data 132. As described above, user data 132 can be associated with data that can indicate interactions between user(s) 106, container(s), and/or container element(s). Additionally, the database 130 can store one or more data structures, such as graph(s) 134, generated by the graph generation module 120.

As described above, user(s) 106 can operate corresponding device(s) 108 (e.g., user devices) to perform various functions associated with the device(s) 108. The device(s) 108 can represent a diverse variety of device types and are not limited to any particular type of device. Examples of device(s) 108 can include but are not limited to stationary computers, mobile computers, embedded computers, or combinations thereof. Example stationary computers can include desktop computers, work stations, personal computers, thin clients, terminals, game consoles, personal video recorders (PVRs), set-top boxes, or the like. Example mobile computers can include laptop computers, tablet computers, wearable computers, implanted computing devices, telecommunication devices, automotive computers, portable gaming devices, media players, cameras, or the like. Example embedded computers can include network enabled televisions, integrated components for inclusion in a computing device, appliances, microcontrollers, digital signal processors, or any other sort of processing device, or the like.

Depending on the exact configuration and type of the server(s) 110, computer-readable media 114, can include computer storage media and/or communication media. Computer storage media can include volatile memory, non-volatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast, communication media can embody computer readable instructions, data structures, program modules, or other data in a modulated data signal, such as a carrier wave, or other transmission mechanism. The term "modulated data signal" means a signal that has one or more of its characteristics set or changed in such a manner as to encode information in the signal. Such signals or carrier waves, etc. can be propagated on wired media such as a wired network or direct-wired connection, and/or wireless media such as acoustic, RF, infrared and other wireless media. As defined herein, computer storage media does not include communication media. That is, computer storage media does not include communications media consisting solely of a modulated data signal, a carrier wave, or a propagated signal, per se.

Figure 2:
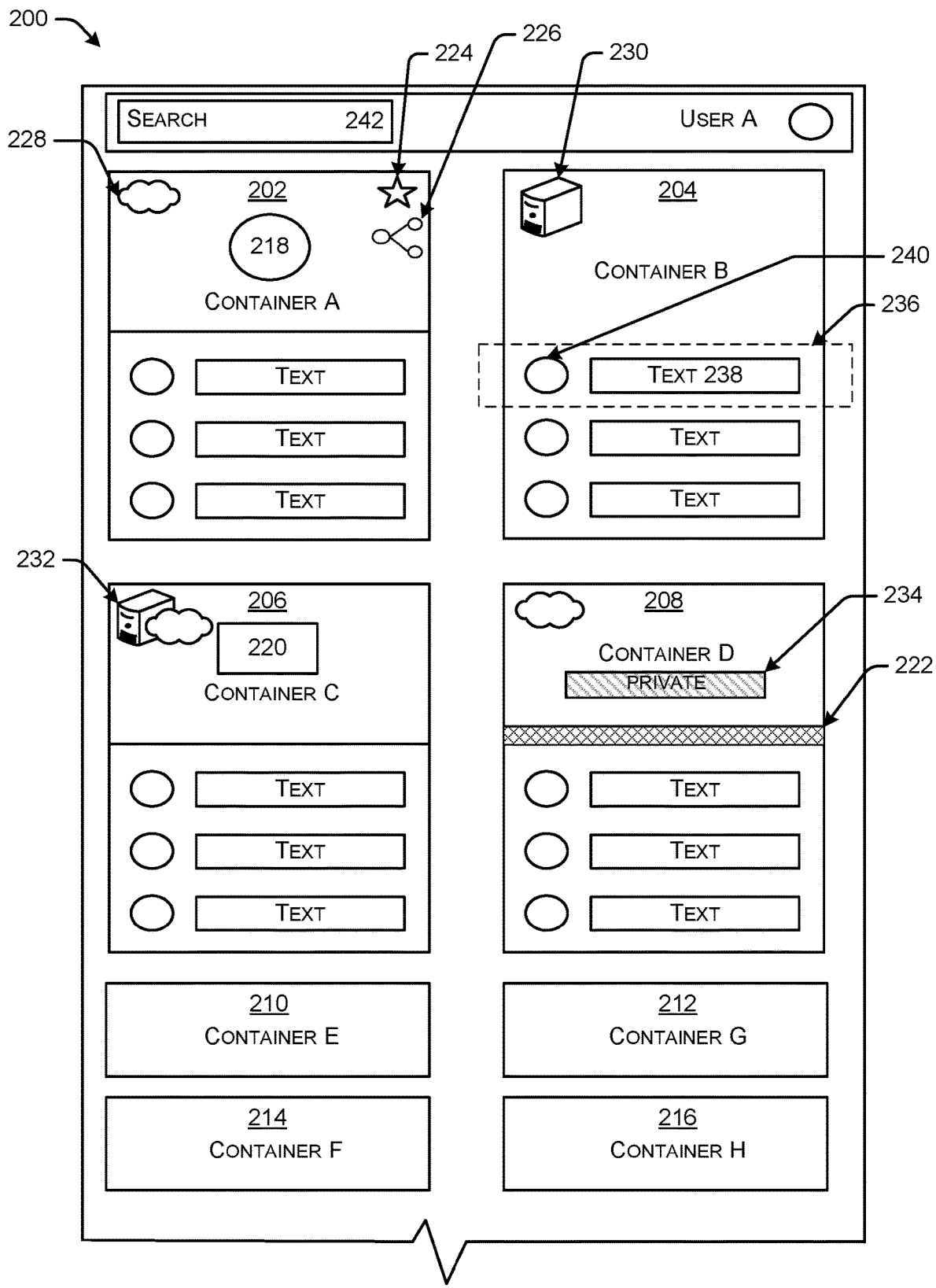
FIG. 2 is a schematic diagram that illustrates an example user interface as described herein.

FIG. 2 is a schematic diagram that illustrates an example user interface 200. The UI generation module 122 can generate user interface 200 for surfacing relevant content to user(s) 106. In at least one example, user interface 200 can be a content page corresponding to a home page of a collaboration services application. As shown in FIG. 2, user interface 200 can include various interface elements. In at least one example, the interface elements can include graphical elements resembling cards. As described above, a card can be a convenient means of displaying content that serves as an entry point to more detailed information. Each card can correspond to a container. In at least one example, cards can be organized on the user interface in an equal plane and in an order that can be based at least in part on the relevance of the containers represented by the cards to a user 106. In at least one example, the UI generation module 122 can place cards that are representative of containers having strong relationships with the user 106 (i.e., a top ranking weight, a weight above a threshold weight, etc.) in a prominent position on the user interface. For instance, such cards can be placed at the top of the user interface 200 or a top left corner of the user interface 200. In at least one example, the cards can be arranged such that as a user 106 moves left to right and top to bottom of the user interface 200, the cards become less relevant to the user 106.

As described above, in at least one example, the UI generation module 122 can access data structure(s) (e.g., graph(s) 134) to determine content that can be surface via user interface(s), such as user interface 200. In an example, the UI generation module 122 can determine a number of relevant containers based at least in part on the data structure(s) (e.g., graph(s) 134). In at least one example, the UI generation module 122 can rank the container(s) based at least in part on corresponding weight(s). As an example, the containers can be ranked such that a top ranking container is associated with a relationship having a highest weight. The UI generation module 122 can arrange the cards such that top ranking cards can be placed at the top of the user interface 200 or a top left corner of the user interface 200. In at least one example, the cards can be arranged such that as a user 106 moves left to right and top to bottom of the user interface 200, the cards become less relevant to the user 106.

In FIG. 2, eight cards (e.g., 202-216) are shown on the user interface 200. Each card can be associated with a different container and each container can be identified using one or more data items. In some examples, each card can include a title associated with the container represented by the card, one or more data items providing contextual information about the container, etc. Additionally, in at least one example, a card can include one or more interface elements that convey information to user(s) 106. In some examples, one or more interface elements can identify actions that can be taken by a user 106 with respect to a container represented by the card (e.g., follow, share, etc.), whether a container represented by a card is associated with local and/or remote servers, whether a container represented by a card is public or private, etc. In additional and/or alternative examples, a group of one or more interface elements can correspond to container elements associated with the container represented by the card, as described below.

In at least one example, each card can have a distinct presentation based on a type of container that each card represents. The distinct presentation can be determined based on an arrangement of data items and/or the interface elements. That is, cards representing containers that are a same type can have a substantially similar layout, include substantially similar data items, etc. Distinct presentations corresponding to different container types enable users 106 to quickly consume the content presented on the user interface 200. For instance, by glancing at a card, a user 106 can identify at least a title of a container and a type of container the card represents. Or, by glancing through one or more cards, a user 106 can differentiate between container types based on the presentation of corresponding cards.

In FIG. 2, card 202 represents a first type of container, card 204 represents a second type of container, card 206 represents a third type of container, and card 208 represents a fourth type of container. As a non-limiting example, card 202 can correspond to a blogging site, card 204 can correspond to a team site, card 206 can correspond to a corporate site, and card 208 can correspond to a video channel. Accordingly, each card that represents a blogging site can have a substantially similar presentation as card 202, each card that represents a team site can have a substantially similar presentation as card 204, each card that represents a corporate site can have a substantially similar presentation as card 206, and each card that represents a video channel can have a substantially similar presentation as card 208.

In FIG. 2, card 202 corresponds to a container titled CONTAINER A. Card 202 can include additional data associated with Container A. For instance, the card 202 can include data such as a number of user(s) 106 that are associated with Container A or a date that Container A was created. The data can be based on metadata and the UI generation module 122 can access the metadata to determine what to include on the card. In at least one example, Container A can correspond to a blogging site and the title, CONTAINER A, can correspond to a title of the blog. Furthermore, in an example, the data included in the card 202 can include a description of the blog or the author associated with the blogging site. Additionally, the card can include an interface element 218 providing a user 106 with context associated with the container. In some examples, the interface element 218 can be an image of the author or, in other examples, the interface element can be a logo associated with the blog. As illustrated in FIG. 2, the interface element 218 can have a circular shape, which can be specific to the presentation of cards representing blogging sites. Additional and/or alternative shapes and/or configurations can be associated with card 202.

Card 204 corresponds to a container titled CONTAINER B. Card 204 can include additional data associated with Container B. For instance, the card 204 can include data such as a number of user(s) 106 that are associated with Container B or a date that Container B was created. The data can be based on metadata and the UI generation module 122 can access the metadata to determine what to include on the card. In at least one example, Container B can correspond to a team site and the title, CONTAINER B, can correspond to a team name or project name. Furthermore, in an example, the data included in the card 204 can identify a team leader or an upcoming project launch. In such an example, the card 204 can include an interface element providing a user 106 with context associated with the container. In some examples, the interface element can cover the entire surface area of the card 204. For instance, the interface element can be a photo of the team, a color representative of the team, a pattern, etc. Additional and/or alternative shapes and/or configurations can be associated with card 204.

Card 206 corresponds to a container titled CONTAINER C. Card 206 can include additional data associated with Container C. For instance, the card 206 can include data such as a number of user(s) 106 that are associated with Container C or a date that Container C was created. The data can be based on metadata and the UI generation module 122 can access the metadata to determine what to include on the card 206. In at least one example, Container C can correspond to a corporate site and the title, CONTAINER C, can correspond to a name of a corporation. In such an example, the card 206 can include data associated with hours of operation, directions, etc. In at least one example, the card 206 can include an interface element 220 providing a user 106 with context associated with the container. In some examples, the interface element can depict a logo associated with the corporation. In at least one example, the shape of the interface element can be different than the shape used for other cards (e.g., card 202). Additional and/or alternative shapes and/or configurations can be associated with card 206.

Card 208 corresponds to a container titled CONTAINER D. Card 208 can include additional data associated with Container D. For instance, the card 208 can include data such as a number of user(s) 106 that are associated with Container D or a date that Container D was created. The data can be based on metadata and the UI generation module 122 can access the metadata to determine what to include on the card. In at least one example, Container D can correspond to a video channel and the title, CONTAINER D, can correspond to a name of the channel. In such an example, the card can include an interface element providing a user 106 with context associated with the container. In some examples, the interface element can be a stripe 222 associated with a color that represents a color of the video channel. In other examples, a portion of the card 208 can be associated with a video segment. Additional and/or alternative shapes and/or configurations can be associated with card 208.

In at least one example, cards can include one or more interface elements that convey additional and/or alternative information to user(s) 106, as described above. For instance, in some examples, user(s) 106 can interact directly with a card to call an action (e.g., share, follow, send in message, etc.). FIG. 2 illustrates a non-limiting example of an interface element 224 that a user 106 can actuate to follow Container A. That is, interface element 224 can correspond to a control, the actuation of which can send data to the user interaction module 124. Additional and/or alternative interface elements can be used. The user interaction module 124 can receive data indicating that the user 106 interacted with the user interface 200 to indicate that he or she is following Container A. In such examples, the user interaction module 124 can send the data indicating that the user 106 interacted with the user interface 200 to indicate that the user 106 is following Container A to the database 130 and the database can store the data in the user data 132. The graph generation module 120 can access the data and can add an edge between an object representing a user 106 and an object representing Container A in a graph. The weight associated with the edge can be based at least in part on the timestamp associated with the user interaction.

Additionally, FIG. 2 illustrates a non-limiting example of an interface element 226 that a user 106 can actuate to share Container A with one or more other users 106. Additional and/or alternative interface elements can be used. The user interaction module 124 can receive data indicating that the user 106 interacted with the user interface 200 to indicate that he or she shares CONTAINER A with one or more other users 106. In such examples, the user interaction module 124 can send the data indicating that the user 106 interacted with the user interface 200 to indicate that the user 106 shared Container A to the database 130 and the database can store the data in the user data 132. The graph generation module 120 can access the data and can add an edge between an object representing a user 106 and an object representing Container A in a graph. The weight associated with the edge can be based at least in part on the timestamp associated with the user interaction.

Moreover, one or more interface elements can convey to user(s) 106 that a container is associated with local servers and/or remote servers (e.g., servers associated with a cloud, etc.). In at least one example, the UI generation module 122 can access data associated with a container to determine whether the container is associated with local servers and/or remote servers. Based at least in part on determining that a container is associated with remote servers, the UI generation module 122 can cause a first interface element 228 to be presented via the card corresponding to the container. Based at least in part on determining that a container is associated with local servers, the UI generation module 122 can cause a second interface element 230 to be presented via the card corresponding to the container. Or, based at least in part on determining that a container is associated with both local servers and remote servers, the UI generation module 122 can cause a third interface element 232 to be presented via the card corresponding to the container. In FIG. 2, Container A and Container D are associated with remote servers, as denoted by interface element 228. Container B is associated with local servers, as denoted by interface element 230, and Container C is associated with both local servers and cloud servers, as denoted by interface element 232. Interface elements 228-232 are non-limiting examples of interface elements that can convey information to user(s) 106. Additional and/or alternative interface elements can be used. For instance, a different graphical element can be used to depict whether a container is associated with local servers and/or remote servers, a textual element can be used whether a container is associated with local servers and/or remote servers, etc.

Furthermore, the one or more interface elements can convey permissions associated with the containers. In at least one example, a first user 106 can have permission to view a particular container, pursuant to permissions data associated with the container. However, the container may not be public. Accordingly, in at least one example, the one or more interface elements can denote whether a container is public, private, confidential, etc. In at least one example, the UI generation module 122 can access permissions data associated with a container to determine whether the container is a public container or private container. For the purpose of this discussion, a public container can be a container that is accessible by all user(s) 106 of a collaborative computing environment. For the purpose of this discussion, a private container can be accessible by a limited number of user(s) 106 that have been granted permission to access the container. Based at least in part on determining that a container is a private container, the UI generation module 122 can cause an interface element 234 to be presented via the card corresponding to the container. As shown in FIG. 2, interface element 234 can denote that Container D is private. In at least one example, a user 106 can interact with the interface element denoting that a container is private (e.g., interface element 234) and a popup, overlay, etc. can be presented to enable the user 106 to identify other user(s) 106 that have access to the container. Additional and/or alternative interface elements can be used to denote that a container is confidential, privileged, etc. Interface element 234 is but a single example of an interface element that can be used to identify that a container is private and additional and/or alternative interface elements 234 can be used to denote same or similar information.

As described above, each card can correspond to a container. In at least one example, each card can include a group of one or more interface elements corresponding to container elements. An example interface element corresponding to a container element is identified in FIG. 2 by box 236. The one or more interface elements corresponding to container elements can be arranged in an order on the card that corresponds to how relevant each container element is to the user 106. As described above, the UI generation module 122 can determine a number of relevant container elements based at least in part on accessing data structures (e.g., graph(s) 134) that represent relationships between a user 106, container(s), and/or container element(s). Based at least in part on identifying container element(s) with which a user 106 has a relationship, the UI generation module 122 can determine one or more container elements that are relevant to the user 106 based at least in part on weights associated with the relationships. In at least one example, the one or more containers that are relevant to the user 106 can be container(s) associated with relationships associated with highest ranking weights or weights above a threshold weight.

In at least one example, the UI generation module 122 can arrange the interface elements corresponding to the container elements in an order such that the most relevant interface element is positioned in a first position in a list of interface elements. As the user 106 moves through the list of one or more interface elements corresponding to container elements, each interface element can represent a container element that is less relevant to the user 106.

In at least one example, each interface element of the group of one or more interface elements can include graphical elements, textual elements, etc. to identify a container element and/or convey an interaction associated with the container element. As described above, the textual elements, graphical elements, etc. can convey information explaining why a container element is relevant to a user 106. For instance, a textual element can identify an actor (e.g., user 106) associated with the interaction, an action associated with the interaction, the container element, and a timestamp associated with the interaction. As a non-limiting example, the textual element 238 can read "User A created Document ABC 4 hours ago" or "User B updated Document XYZ 2 hours ago."

In some examples, a container element determined to be relevant can be associated with one or more interactions associated with one or more users 106. In such examples, the UI generation module 122 can leverage weights associated with each interaction of the one or more interactions to determine which interaction to surface with the interface element corresponding to the container element. As a non-limiting example, User A may have modified Document ABC two hours ago and User B may have viewed Document ABC fifteen minutes ago. Leveraging techniques described above, the relationship determination module 118 can determine a weight for the interaction between User A and Document ABC that is greater than the weight associated with the interaction between User B and Document ABC. Accordingly, the UI generation module 122 can surface the interaction associated with User A in the interface element representative of Document ABC. That is, textual element 238 can read, "User A modified Document ABC 2 hours ago." Such textual elements 238 can be useful for conveying relevant interactions with relevant container elements to users 106.

In other examples, if more than one user 106 has interacted with a same container element, the textual element associated with the interface element can identify that more than one user 106 has interacted with the container element. As a non-limiting example, the textual element 238 can read "5 users viewed Document ABC within the last 2 hours."

Additionally and/or alternatively, an interface element can include a textual element indicating a status of a container element. For instance, the container element can be trending, pending approval, requesting approval, etc. As a non-limiting example, the textual element 238 can say "Blog Post XYZ is trending with your friends."

Furthermore, an interface element corresponding to a container element can include a graphical representation 240 (e.g., image, logo, etc.) of the actor, the action, etc.

Cards 210-216 are examples of cards with different configurations than cards 202-208. That is, cards 210-216 may not include a same amount of data on the cards as cards 202-208. For instance, in some examples, a card may not include a group of one or more interface elements representative of container elements. In some examples, a device and/or size of a user interface can determine the configurations of the cards. In other examples, user preferences can determine configurations of the cards. In yet additional and/or alternative examples, the different configurations can indicate a difference between cards with a first amount of information and cards with a second amount of information. For instance, the configuration of cards 210-216 can convey to a user 106 that the containers represented by cards 210-216 are recommendations for the user 106. Or, the configuration of cards 210-216 can convey to a user 106 that the containers represented by cards 210-216 have been determined to be less relevant to the user 106 than cards 202-208. In such an example, if the user 106 desires to see more information associated with cards 210-216, the user 106 can interact with individual ones of the cards 210-216 to access additional information. Various configurations of the cards are described in FIGS. 3A, 3B, and 3C, below.

In at least one example, cards (e.g., cards 202-216) can be associated with a mechanism that launches a user 106 directly to a container or a container element. For instance, a user 106 can click on, touch, or otherwise select a card and the user interaction module 124 can launch a corresponding container. That is, a card can be associated with a direct link to a container. Additionally and/or alternatively, a user 106 can click on, touch, or otherwise select an interface element corresponding to a container element and the user interaction module 124 can take the user 106 to the container element. That is, an interface element can be associated with a direct link to a container element.

In some examples, the user interaction module 124 can cause the container element to be presented to the user 106 such that the user 106 can access the container element in a position in the container element that corresponds to the interaction surfaced via the interface element. As a non-limiting example, a user 106 can interact with an interface element associated with a container element. The interface element can include a textual element that indicates that User A edited the container element one hour ago. Based at least in part on the user 106 interacting with the interface element, the user interaction module 124 can cause the container element to be presented to the user 106 such that the portion of the container element edited by User A is visible via the user interface.

User interface 200 can include regions to surface additional and/or alternative content to user(s) 106. For instance, in at least one example, region 242 can be associated with a search bar for user(s) 106 to input queries. As a non-limiting example, a query may be associated with a particular document that a team of users 106 is working on in the collaborative computing environment and/or a video uploaded to the collaborative computing environment. Or, a query may be associated with a particular site (e.g., team site, blogging site, publishing site, etc.) associated with a collaborative computing environment. In additional and/or alternative examples, the queries can be associated with user(s) 106. As described above, the search module 126 can receive the query and can determine a result based at least in part on data structure(s) (e.g., graph(s) 134) that are representative of relationships between user(s) 106, container(s), and/or container element(s). The UI generation module 122 can cause the results to be presented via the user interface 200. For instance, the results can be presented via a region of the user interface, via a popup, via an overlay, etc. Furthermore, the user interface 200 can include one or more regions associated with favorite links of the user 106, regions associated with pinned content, regions associated with recommended documents (not associated with a card included in the user interface 200), etc. Such content and/or additional and/or alternative content can be incorporated into user interface 200. User interface 200 can include additional and/or alternative controls (e.g., hyperlinks, overlays, etc.) that a user 106 can actuate to change a number of cards displayed on the user interface 200 (e.g., "see all" or "see more"), change an arrangement of the cards on the user interface 200, etc.

As described above, the cards can have a variety of configurations and/or sizes. The cards can have different sizes and/or be arranged in different configurations such to enable content to be surfaced based on devices and/or displays of different sizes without disrupting the flow of the overall layout of the user interface(s). FIGS. 3A, 3B, and 3C illustrate three different sizes of cards. FIG. 3A is a schematic diagram that illustrates an example interface element representative of a container (e.g., a card) as described herein. Card 300 can be a same card as card 202 in FIG. 2, or a different card. As shown in FIG. 3A, card 300 can include a group of three interface elements that correspond to three different container elements, Container Element A, Container Element B, and Container Element C. In alternative examples, card 300 can include a group of interface elements that can be more or less than three interface elements. FIG. 3B illustrates an example of a card 302 that has less surface area than card 300 and includes a single interface element representative of a container element. FIG. 3C illustrates an example of a card 304 that has the least amount of surface area and does not include an interface element that is representative of a container element.

In at least one example, the size of the group of interface elements can be determined by the surface area that is available on the user interface. In some examples, the surface area can be determined by the device 108 associated with the user 106 and/or the size of the display associated with the device 108. For instance, if device 108 is a desktop computer, the user interface may have more surface area and, accordingly, card 300 can include a group of three or more interface elements corresponding to container elements. However, if the device 108 is a mobile device, the user interface may have less surface area, and accordingly, card 300 can include fewer (or no) interface elements in the group, as illustrated in FIGS. 3B and 3C. Furthermore, the arrangement of the cards can be determined by the surface area that is available on the user interface, which can be determined by the device 108 associated with a user 106. For instance, the cards can be stacked vertically (e.g., an activity stream) or stacked horizontally (e.g., columns on a tablet), can be a fixed height or variable height, can be a fixed width or variable width, etc. Accordingly, the user interface(s) described herein can be configured to surface information to user(s) via devices 108 of various types and/or displays of various sizes without disrupting the flow of the overall layout. In additional and/or alternative examples, the user interface(s) can be configured based on preference(s) of the user(s) 106.

FIG. 3A illustrates some additional and/or alternative details associated with the group of interface elements corresponding to container elements. As described above, each card can be associated with one or more interface elements that can convey to user(s) 106 that a container is associated with local servers and/or remote servers. Additionally and/or alternatively, individual interface elements of the group of interface elements corresponding to container elements can also include an interface element indicating whether a particular container element is associated with local servers and/or remote servers. In at least one example, the UI generation module 122 can access data associated with a container element to determine whether the container element is associated with local servers and/or remote servers. Based at least in part on determining that a container element is associated with remote servers, the UI generation module 122 can cause the first interface element 228 to be rendered in association with the interface element corresponding to the container element. Based at least in part on determining that a container element is associated with local servers, the UI generation module 122 can cause the second interface element 230 to be rendered in association with the interface element corresponding to the container element. Or, based at least in part on determining that a container is associated with both local servers and remote servers, the UI generation module 122 can cause a third interface element to be rendered in association with the interface element corresponding to the container element. In FIG. 3A, Container Element A is associated with remote servers, as denoted by interface element 228. Container Element B is associated with local servers, as denoted by interface element 230. Container Element C is associated with both local servers and cloud servers, as denoted by interface element 232. As described above, additional and/or alternative interface elements can be used to denote same or similar information.

As described above, in at least one example, one or more interface elements associated with a card can convey permissions associated with the container. Additionally and/or alternatively, individual interface elements of the group of interface elements can include one or more interface elements that convey permissions associated with corresponding container elements. In at least one example, the UI generation module 122 can access permissions data associated with a container element to determine whether the container element is a public container element or private container element. Based at least in part on determining that a container element is a private container element, the UI generation module 122 can cause an interface element to be presented via the card corresponding to the container element. Additional and/or alternative interface elements can be used to denote that a container element is confidential, privileged, etc. As described above, additional and/or alternative interface elements can be used to denote same or similar information.

Figures 4A, 4B:
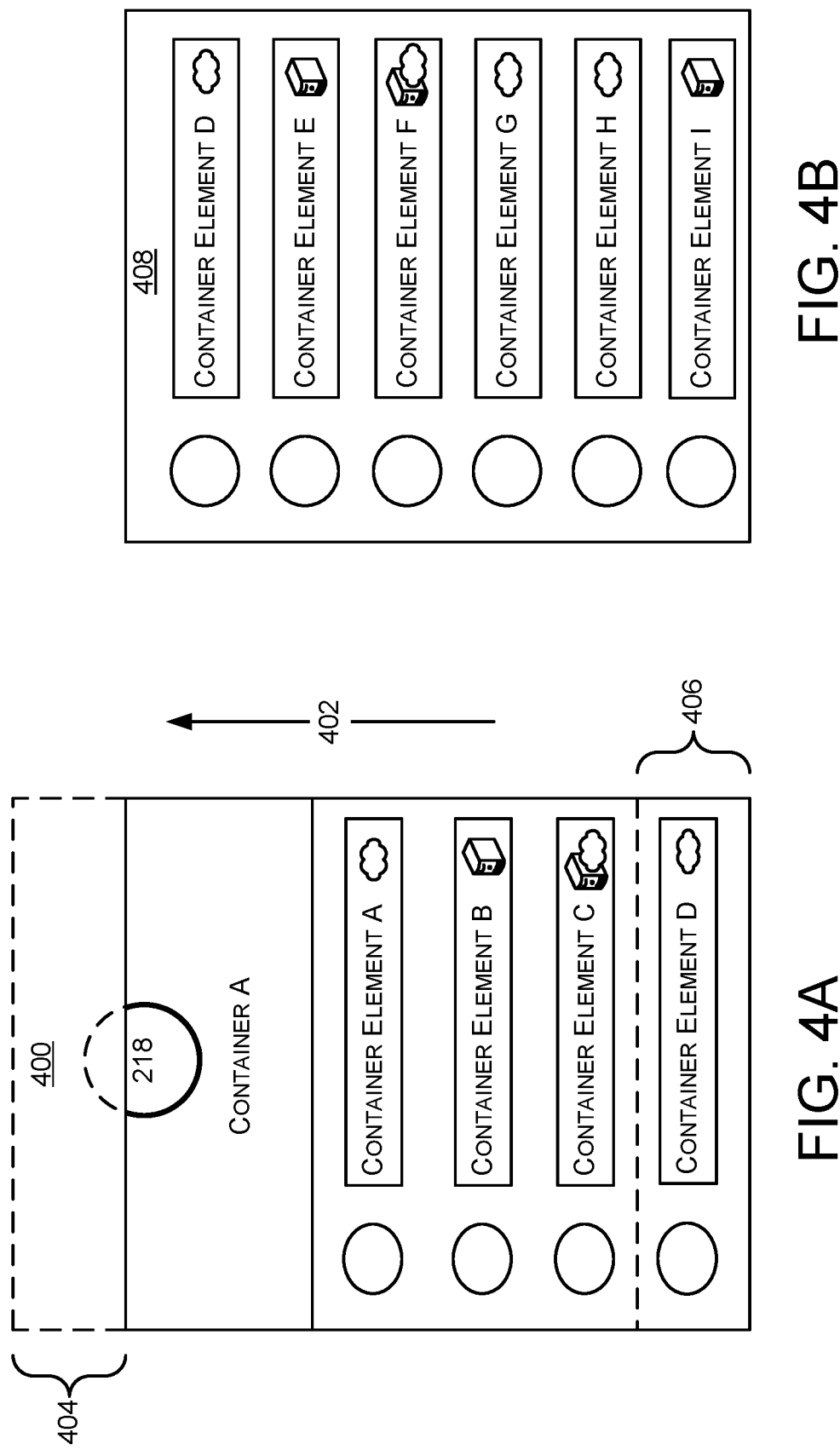
FIG. 4A is a schematic diagram that illustrates an example of an interface element representative of a container (e.g., a card) as described herein.
FIG. 4B is a schematic diagram that illustrates another example of an interface element representative of a container (e.g., a card) as described herein.

FIG. 4A is a schematic diagram that illustrates an example of an interface element representative of a container (e.g., a card) as described herein. Card 400, as illustrated in FIG. 4A, can be a same card as card 202 and/or card 300, or a different card. In some examples, a user 106 can interact with a card 400, as described above. For instance, a user 106 can perform a gesture associated with a scroll functionality to access additional and/or alternative content that was not previously available on the card 400. In such examples, the user interaction module 124 can receive data indicating the interaction and can cause the scroll functionality to be effectuated on the device 108. For instance, in at least one example, a gesture associated with a scrolling function in an upward direction (as shown by arrow 402) can cause content that was previously visible to become hidden (e.g., portion 404) and content that was previously hidden to become visible (e.g., portion 406). In such examples, one or more additional interface elements corresponding to container elements can be surfaced in association with the card 400. That is, in FIG. 4, the interface element associated with Container Element D can become visible responsive to the gesture.

In an additional and/or alternative example, a user 106 can interact with a card (e.g., card 400) such to cause a new user interface element to be presented. In some examples, the user can interact with the card (e.g., card 400) by a gesture associated with an upward swipe, a downward swipe, a swipe to the left, or a swipe to the right to cause the new user interface to be presented. In other examples, a user 106 can actuate a control associated with the card (e.g., card 400) to cause a new user interface to be presented. For instance, based at least in part on the gesture or the actuation of the control, the user interaction module 124 can cause a card (e.g., card 400) to appear to flip from a front of a card to a back of the card. That is, in at least one example, the new user interface can resemble a back of a card 408 and can surface additional interface elements that are representative of container elements that were not included in the first user interface associated with card (e.g., the front of the card 400), as illustrated in FIG. 4B. In such examples, the UI generation module 122 can arrange the interface elements corresponding to the container elements in an order such that the most relevant interface element is positioned in a first position in a list of interface elements. As the user 106 moves through one or more interface elements corresponding to container elements on the back of the card 408, each interface element can represent a container element that is less relevant to the user 106. In some examples, the one or more interface elements on the back of the card 408 can be a continuation of the interface element(s) on the front of the card 400.

In some examples, additional controls can be associated with a card to enable a user 106 to access additional and/or alternative information that is associated with the container, but not depicted via the card.

While the disclosure above describes cards as graphical elements representing containers on the user interface, additional and/or alternative graphical elements can be used. Generally, cards are rectangular-shaped graphical elements organized in an equal plane. However, the graphical elements can have any shape (e.g., circular, square, etc.) and/or size. Additionally and/or alternatively, the graphical elements can be arranged in any configuration. That is, the graphical elements described above are not limited to cards and/or the configurations described above.

Example Processes

The processes described in FIGS. 5 and 6 below are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 5:
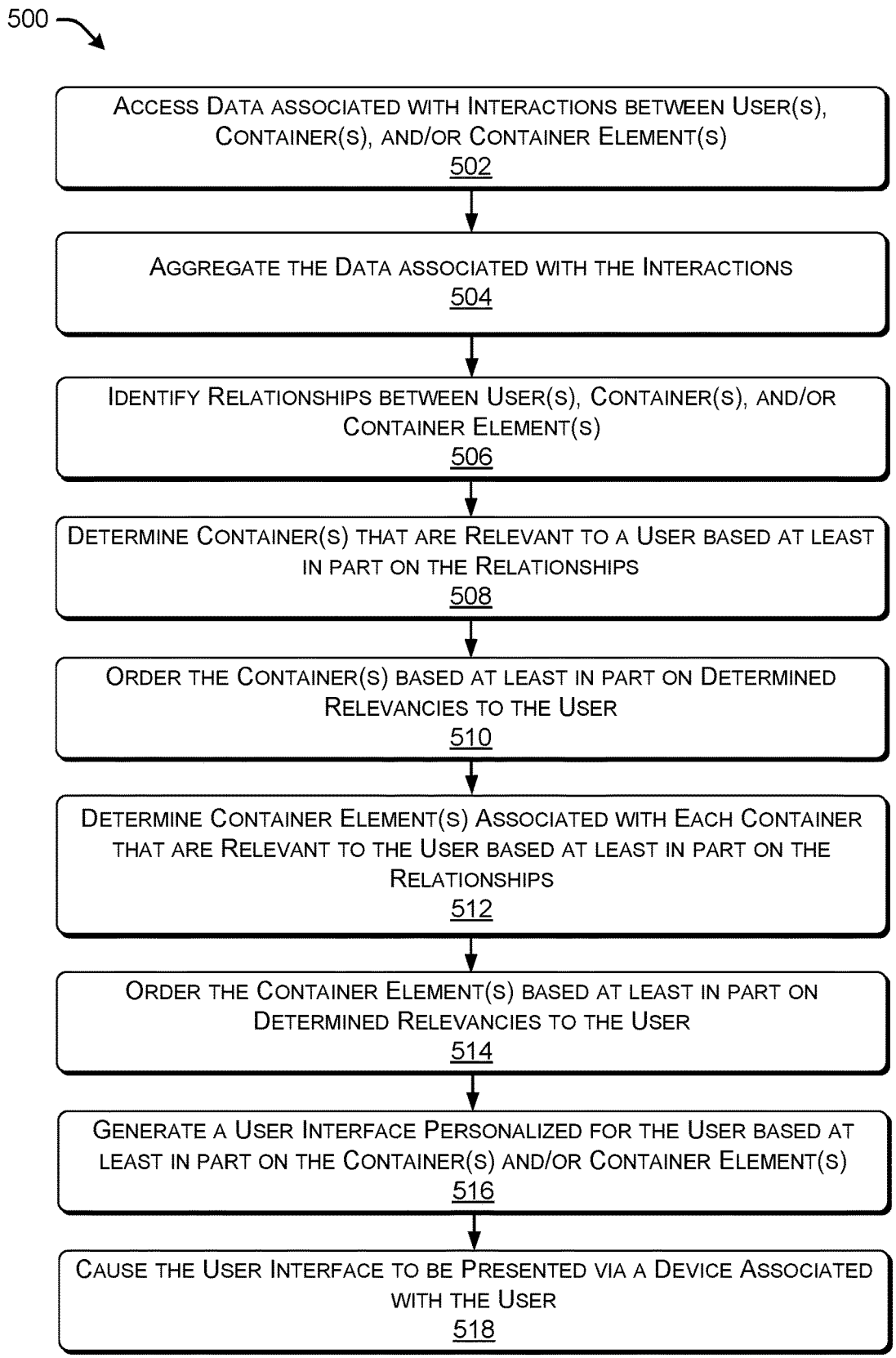
FIG. 5 is a flow diagram that illustrates an example process to generate a user interface that is personalized for a user based at least in part on relationships between user(s), container(s), and/or container element(s).

FIG. 5 is a flow diagram that illustrates an example process 500 to generate a user interface that is personalized for a user 106 based at least in part on relationships between user(s) 106, container(s), and/or container element(s).

Block 502 illustrates accessing data associated with interactions between user(s) 106, container(s), and/or container element(s). The data aggregation module 116 can receive, access, and/or determine data from local storage associated with the device(s) 108 and/or service provider 102 (e.g., user data 132), remote storage repositories associated with the device(s) 108 and/or the service provider 102, and/or third party sources or systems. The data can indicate interactions between user(s) 106, container(s), and/or container element(s), as described above.

Block 504 illustrates aggregating the data associated with the interactions. The data aggregation module 116 can aggregate data associated with interactions between user(s) 106, container(s), and/or container element(s), as described above.

Block 506 illustrates identifying relationships between user(s) 106, container(s), and/or container element(s). The relationship determination module 118 can identify and/or determine relationships between user(s) 106, container(s), and/or container element(s) based at least in part on processing data aggregated by the data aggregation module 116, as described above. In at least one example, the relationship determination module 118 can determine weights associated with relationships between user(s) 106, container(s), and/or container element(s). The weights can correspond to relevance, as described above.

In at least one example, the graph generation module 120 can generate data structures for representing relationships determined by the relationship determination module 118, as described above. In at least one example, a data structure can be a graph. Additionally and/or alternatively, a data structure can be a matrix or any other data structure that can visually depict relationships between user(s) 106, container(s), and/ or container element(s). As described above, the data structures can be stored in the database 130, as described above.

Block 508 illustrates determining container(s) that are relevant to a user 106 based at least in part on the relationships. In at least one example, the UI generation module 122 can access data structure(s) (e.g., graph(s) 134) to determine a number of relevant container(s) based at least in part on the data structure(s). In at least one example, the UI generation module 122 can identify an object associated with a user 106. The UI generation module 122 can identify the relationships between the user 106 and container(s) via transitive closure of the graph. That is, the UI generation module 122 can determine other objects that correspond to container(s) that are reachable from the object associated with the user 106 via an edge. Based at least in part on identifying container(s) with which a user 106 has a relationship, the UI generation module 122 can leverage weights associated with identified relationships to determine which of the container(s) are relevant to the user 106. In at least one example, the one or more containers that are relevant to the user 106 can be container(s) associated with relationships having highest ranking weights or weights above a threshold weight.

In some examples, the UI generation module 122 can determine that a user 106 does not have a relationship with enough containers to fulfill the number of containers desired by the UI generation module 122. In such examples, the UI generation module 122 can fall back to containers that are relevant to user(s) 106 that are associated with the user 106, containers that are relevant to user(s) 106 who are part of a same team and/or a same tenant (e.g., business), containers that are relevant to all user(s) 106, respectively. The UI generation module 122 can determine the fall back containers leveraging weights associated with relationships corresponding to the containers, as described above.

Block 510 illustrates ordering the container(s) based at least in part on determined relevancies to the user 106. As described above, cards corresponding to containers can be organized on the user interface in an order that can be based at least in part on the respective relevancies of the containers represented by the cards to a user 106. In at least one example, the UI generation module 122 can order the container(s) based at least in part on weights corresponding to each container (i.e., a weight associated with a relationship between the container and the user 106). In an example, the UI generation module 122 can determine that card(s) representing container(s) having strong relationships with the user 106 (i.e., a top ranking weight, a weight above a threshold weight, etc.) can be positioned in a prominent position on the user interface. For instance, such cards can be placed at the top of the user interface or a top left corner of the user interface. In at least one example, the cards can be arranged such that as a user 106 moves left to right and top to bottom of the user interface, the cards become less relevant to the user 106. Block 512 illustrates determining container element(s) associated with each container that are relevant to the user 106 based at least in part on the relationships. In such an example, the UI generation module 122 can access data structures (e.g., graph(s) 134) to determine relationships between a user 106, container(s), and/or container element(s). In at least one example, the UI generation module 122 can identify an object associated with a user 106. The UI generation module 122 can identify the relationships between the user 106 and container element(s) via transitive closure of the graph. In at least one example, the UI generation module 122 can determine a relevant container and one or more container elements that are related to the relevant container. Then, the UI generation module 122 can make a transitive closure along edges between the user 106 and the container and the container and the one or more container elements. That is, the UI generation module 122 can determine other objects that correspond to container element(s) that are reachable from the object associated with the user 106 via one or more edges. Based at least in part on identifying container element(s) with which a user 106 has a relationship, the UI generation module 122 can leverage weights associated with identified relationships to determine which of the container element(s) are relevant to the user 106. In at least one example, the one or more container elements that are relevant to the user 106 can be container element(s) associated with relationships associated with highest ranking weights or weights above a threshold weight.

In some examples, the UI generation module 122 can determine that a user 106 does not have relationships with enough container elements within a container to fulfill the number of container elements desired by the UI generation module 122. In such examples, the UI generation module 122 can fall back to container elements that are relevant to user(s) 106 that are associated with the user 106, container elements that are relevant to user(s) 106 who are part of a same team and/or a same tenant (e.g., business), container elements that are relevant to all user(s) 106, respectively. The UI generation module 122 can determine the fall back container elements leveraging weights associated with relationships corresponding to the container elements, as described above.

Block 514 illustrates ordering the container element(s) based at least in part on determined relevancies to the user 106. As described above, interface elements corresponding to container elements can be organized on the user interface in an order that can be based at least in part on the relevance of the container elements to a user 106. In at least one example, the UI generation module 122 can order the container element(s) based at least in part on weights associated with each container element (i.e., a weight associated with a relationship between the container element and the user 106). In an example, the UI generation module 122 can determine that interface elements representing container elements having strong relationships with the user 106 (i.e., a top ranking weight, a weight above a threshold weight, etc.) can be positioned in a first position in a list of interface elements. As the user 106 moves through the list of interface elements corresponding to container elements, each interface element can represent a container element that is less relevant to the user 106.

Block 516 illustrates generating a user interface personalized for the user 106 based at least in part on the container(s) and/or the container element(s). In at least one example, the UI generation module 122 can generate user interface(s) that are configured to surface relevant content (e.g., container(s) and/or container element(s)) to the user(s) 106. In an example, the user interface(s) can be configured to present interface elements representative of containers and container elements to a user 106 via a content page associated with an application 128 (e.g., a collaborative service application). In at least one example, the content page may be a content feed configured to present user(s) 106 with frequently updated content. As described above, the user interface(s) can provide a user 106 with content corresponding to containers and/or container elements that the user 106 is likely going to want to access at a particular moment in time, as described above. In at least one example, the cards can be arranged in a first order determined based at least in part on a relevance of each corresponding container to a user 106 and the group of interface elements can be arranged in a second order based at least in part on the relevance of each corresponding container element to the user 106. FIG. 2 illustrates a non-limiting example of a user interface 200. FIGS. 3A, 3B, 3C, 4A, and 4B illustrate non-limiting examples of the interface elements that are representative of containers and corresponding container elements. In additional and/or alternative examples, the user interface(s) can include additional and/or alternative content such as images, videos, messages, widgets, etc.

Block 518 illustrates causing the user interface to be presented via a device 108 associated with the user 106. As described above, the UI generation module 122 can cause user interface(s) to be presented 106 via device(s) 108 associated with the user(s) 106.

Figure 6:
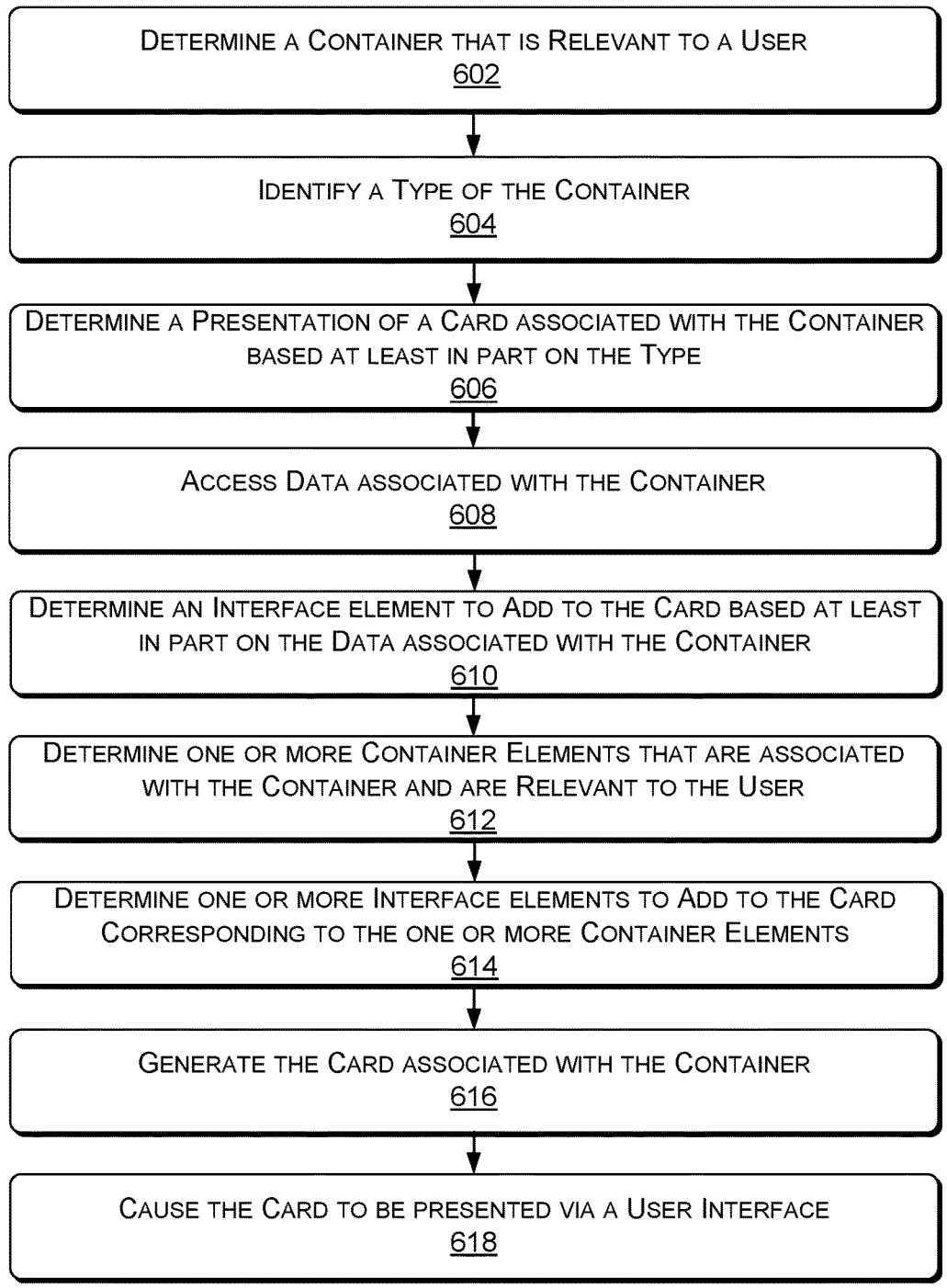
FIG. 6 is a flow diagram that illustrates an example process to generate a card and cause the card to be presented via a user interface.

FIG. 6 is a flow diagram that illustrates an example process 600 to generate a card and cause the card to be presented via a user interface.

Block 602 illustrates determining a container that is relevant to a user 106. As described above, in at least one example, the UI generation module 122 can access data structure(s) (e.g., graph(s) 134) to determine a number of relevant container(s) based at least in part on the data structure(s). Based at least in part on identifying container(s) with which a user 106 has a relationship, the UI generation module 122 can leverage weights associated with identified relationships to determine which of the container(s) are relevant to the user 106. In at least one example, the one or more containers that are relevant to the user 106 can be container(s) associated with relationships having highest ranking weights or weights above a threshold weight.

Block 604 illustrates identifying a type of the container. In at least one example, the UI generation module 122 can identify and/or determine a type of the container. For instance, the UI generation module 122 can determine whether a container is a team site, a blogging site, a corporate site, a video channel, etc. In at least one example, the UI generation module 122 can access data associated with each container to identify and/or determine the type of the container.

Block 606 illustrates determining a presentation of a card associated with the container based at least in part on the type. In at least one example, each card can have a distinct presentation based on a type of container that each card represents. The distinct presentation can be determined based on an arrangement of data items and/or interface elements. That is, cards representing containers that are a same type can have a substantially similar layout, include substantially similar data items, etc. Distinct presentations corresponding to different container types enable users 106 to quickly consume the content presented on the user interface 200. By glancing at a card, a user 106 can identify at least a title of a container and a type of container the card represents.

Block 608 illustrates accessing data associated with the container and block 610 illustrates determining an interface element to add to the card based at least in part on the data associated with the container. In at least one example, a card can include one or more interface elements that convey information to user(s) 106. In some examples, the one or more interface elements can identify actions that can be taken by a user 106 with respect to a container represented by the card (e.g., follow, share, send in message, etc.), whether a container represented by a card is associated with local and/or remote servers, whether a container represented by a card is public or private, etc.

In at least one example, the UI generation module 122 can access data associated with a container to determine whether the container is associated with local servers and/or remote servers. Based at least in part on determining that a container is associated with remote servers, the UI generation module 122 can cause a first interface element (e.g., interface element 228) to be presented via the card corresponding to the container. Based at least in part on determining that a container is associated with local servers, the UI generation module 122 can cause a second interface element (e.g., interface element 230) to be presented via the card corresponding to the container. Or, based at least in part on determining that a container is associated with both local servers and remote servers, the UI generation module 122 can cause a third interface element (e.g., interface element 232) to be presented via the card corresponding to the container. Additionally and/or alternatively, in at least one example, the UI generation module 122 can access permissions data associated with a container to determine whether the container is a public container or private container. Based at least in part on determining that a container is a private container, the UI generation module 122 can cause an interface element (e.g., interface element 234) to be presented via the card corresponding to the container. As shown in FIG. 2, interface element 234 can denote that Container D is private.

Block 612 illustrates determining one or more container elements that are associated with the container and are relevant to the user 106. As described above, in at least one example, the UI generation module 122 can access data structures (e.g., graph(s) 134) to determine relationships between a user 106, container(s), and/or container element(s). Based at least in part on identifying container element(s) with which a user 106 has a relationship, the UI generation module 122 can leverage weights associated with identified relationships to determine which of the container element(s) are relevant to the user 106. In at least one example, the one or more container elements that are relevant to the user 106 can be container element(s) associated with relationships associated with highest ranking weights or weights above a threshold weight.

Block 614 illustrates determining one or more interface elements to add to the card corresponding to the one or more container elements. As described above, each card can correspond to a container. In at least one example, each card can include a group of one or more interface elements corresponding to container elements associated with the container. In at least one example, the group of one or more interface elements can be arranged in an order on the card that corresponds to how relevant each container element is to the user 106. In at least one example, the UI generation module 122 can arrange the interface elements corresponding to the container elements in an order such that the interface element representative of the most relevant container element is positioned in a first position in a list of interface elements. As the user 106 moves through one or more interface elements corresponding to container elements, each interface element can represent a container element that is less relevant to the user 106.

In at least one example, each interface element of the group of one or more interface elements can include graphical elements, textual elements, etc. to identify a container element and/or convey an interaction associated with the container element. For instance, a textual element can identify an actor (e.g., user 106) associated with the interaction, an action associated with the interaction, the container element, and a timestamp associated with the interaction. In some examples, a container element determined to be relevant can be associated with one or more interactions. In such examples, the UI generation module 122 can leverage weights associated with each interaction of the one or more interactions to determine which interaction to surface with the interface element corresponding to the container element, as described above. In at least one example, an interaction with a highest weight can be surfaced. Or, an interaction above a threshold weight can be surfaced. In other examples, if more than one user 106 has interacted with a same container element, the textual element associated with the interface element can identify that more than one user 106 has interacted with the container element, as described above. Additionally and/or alternatively, an interface element can include a textual element indicating a status of a container element, as described above. For instance, the container element can be trending, pending approval, requesting approval, etc.

Block 616 illustrates generating the card associated with the container and block 618 illustrates causing the card to be presented via a user interface. In at least one example, the UI generation module 122 can generate a card representative of the container. Additionally, the UI generation module 122 can generate user interface(s) that are configured to surface relevant content (e.g., container(s) and/or container element(s)) to the user(s) 106. In an example, the user interface(s) can be configured to present interface elements representative of container(s) (e.g., cards) and/or container element(s) to a user 106 via a content page associated with an application 128 (e.g., a collaborative service application). In at least one example, the content page may be a content feed configured to present user(s) 106 with frequently updated content. As described above, the user interface(s) can provide a user 106 with content corresponding to container(s) and/or container element(s) that the user 106 is likely going to want to access at a particular moment in time, as described above. FIG. 2 illustrates a non-limiting example of a user interface 200. FIGS. 3A, 3B, 3C, 4A, and 4B illustrate non-limiting examples of the interface elements that are representative of containers and corresponding container elements. In additional and/or alternative examples, the user interface(s) can include additional and/or alternative content such as images, videos, messages, widgets, etc.

Example Clauses

A. A system comprising: one or more processors; and memory that stores one or more modules that are executable by the one or more processors to cause the system to perform operations comprising: generating a user interface that is configured to surface content via a group of cards, wherein: individual cards of the group of cards are respectively corresponding to individual containers in a group of containers; the individual cards are arranged on the user interface in an order determined based least in part on respective relevancies of the individual containers to a user; and a presentation of an individual card of the individual cards is based at least in part on a type of its corresponding individual container of the individual containers; and causing the user interface to be presented via a device associated with the user.

B. A system as paragraph A recites, the operations further comprising: accessing data associated with interactions between a plurality of users, a plurality of containers, and a plurality of container elements; determining, based at least in part on the data, relationships between the user and the plurality of containers; and determining the group of containers from the plurality of containers based at least in part on the relationships and the respective relevancies.

C. A system as either paragraph A or B recites, the operations further comprising determining an individual relevance of the respective relevancies based at least in part on: determining a relationship between the user and an individual container of the individual containers based at least in part on an interaction between the user and the individual container; determining a timestamp associated with the interaction; determining a weight associated with the relationship based at least in part on the timestamp and an action associated with the interaction; and determining the individual relevance based at least in part on the weight.

D. A system as paragraph C recites, wherein the weight decays exponentially based at least in part on an amount of lapsed time.

E. A system as any of paragraphs A-D recite, the operations further comprising causing the corresponding individual container to be presented via the device based at least in part on a user-selected action with respect to the individual card.

F. A system as any of paragraphs A-E recite, wherein the individual card includes one or more interface elements, an interface element of the one or more interface elements corresponding to a container element associated with the corresponding individual container.

G. A system as paragraph F recites, the operations further comprising causing the container element to be presented via the device based at least in part on a user-selected action with respect to the interface element.

H. A system as paragraph F recites, wherein the one or more interface elements are arranged on the card based at least in part on a relevance between the container element and the user.

I. A system as any of paragraphs A-H recite, wherein the user interface corresponds to a home page of a collaborative computing environment.

J. A user interface presented on a display of a device associated with a user, the user interface comprising: a plurality of cards, a card of the plurality of cards corresponding to a container associated with a collaborative computing environment, the card including one or more first interface elements corresponding to container elements associated with the container, wherein the card is associated with a particular presentation associated with a type of the container.

K. A user interface as paragraph J recites, wherein the plurality of cards are arranged in an order based at least in part on determined relevancies to the user.

L. A user interface as either paragraph J or K recites, wherein the one or more first interface elements are arranged on the card based at least in part on determined relevancies to the user.

M. A user interface as any of paragraphs J-L recite, wherein an interface element of the one or more first interface elements conveys an importance of a container element of the one or more container elements based on indicating at least one of an action performed with respect to the container element, a second user who performed the action, and a timestamp associated with the action.

N. A user interface as any of paragraphs J-M recite, wherein the card is associated with a direct link to the container.

O. A user interface as any of paragraphs J-N recites, wherein each interface element of the one or more first interface elements is associated with a direct link to a corresponding container element.

P. A user interface as any of paragraphs J-O recite, wherein the card further includes a second interface element indicating that the container is associated with at least one of a local server or remote server.

Q. A user interface as any of paragraphs J-P recite, wherein the card further includes a second interface element indicating that the container is a private container.

R. A user interface as any of paragraphs J-Q recite, wherein the card further includes at least one control configured to provide functionality based at least in part on a user-selected action with respect to the container.

S. A user interface as any of paragraphs J-R recite, wherein at least one of a first size of the user interface, a second size of cards in the plurality of cards, a first number of cards in the plurality of cards, or a second number of the one or more first interface elements is scalable based at least in part on a third size of the display.

T. A method for generating a user interface configured to surface relevant content via a device associated with a user of a plurality of users, the method comprising: accessing data associated with interactions between the plurality of users, a plurality of containers, and a plurality of container elements; determining, based at least in part on the data, relationships between the user and the plurality of containers; determining at least two containers from the plurality of containers based at least in part on respective relevancies of the at least two containers to the user; and generating the user interface including first interface elements respectively corresponding to the at least two containers, wherein: the at least two first interface elements are arranged on the user interface in an order determined based least in part on the respective relevancies of the at least two containers to the user; a first interface element of the at least two first interface elements is associated with one or more second interface elements; each second interface element corresponds to a container element of the plurality of container elements associated with a container corresponding to the first interface element; and the one or more second interface elements are arranged on the first interface element based at least in part on respective relevancies of the plurality of container elements to the user.

U. One or more computer-readable media encoded with instructions that, when executed by a processor, configure a computer to perform a method as paragraph T recites.

V. A device comprising one or more processors and one or more computer readable media encoded with instructions that, when executed by the one or more processors, configure a computer to perform a computer-implemented method as paragraph T recites.

W. A method for generating a user interface configured to surface relevant content via a device associated with a user of a plurality of users, the method comprising: means for accessing data associated with interactions between the plurality of users, a plurality of containers, and a plurality of container elements; means for determining, based at least in part on the data, relationships between the user and the plurality of containers; means for determining at least two containers from the plurality of containers based at least in part on respective relevancies of the at least two containers to the user; and means for generating the user interface including first interface elements respectively corresponding to the at least two containers, wherein: the at least two first interface elements are arranged on the user interface in an order determined based least in part on the respective relevancies of the at least two containers to the user; a first interface element of the at least two first interface elements is associated with one or more second interface elements; each second interface element corresponds to a container element of the plurality of container elements associated with a container corresponding to the first interface element; and the one or more second interface elements are arranged on the first interface element based at least in part on respective relevancies of the plurality of container elements to the user.

Conclusion

Although the subject matter has been described in language specific to structural features and/or methodological acts, it is to be understood that the subject matter defined in the appended claims is not necessarily limited to the specific features or acts described. Rather, the specific features and acts are described as illustrative forms of implementing the claims.

Conditional language such as, among others, "can," "could," "might" or "can," unless specifically stated otherwise, are understood within the context to present that certain examples include, while other examples do not necessarily include, certain features, elements and/or steps. Thus, such conditional language is not generally intended to imply that certain features, elements and/or steps are in any way required for one or more examples or that one or more examples necessarily include logic for deciding, with or without input or prompting, whether certain features, elements and/or steps are included or are to be performed in any particular example. Conjunctive language such as the phrase "at least one of X, Y or Z," unless specifically stated otherwise, is to be understood to present that an item, term, etc. can be either X, Y, or Z, or a combination thereof.

What is claimed is:

1. A system comprising:
one or more processors; and
memory that stores one or more modules that are executable by the one or more processors to cause the system to perform operations comprising:
generating a user interface that is configured to surface content via a group of cards, wherein:
individual cards of the group of cards correspond to individual containers in a group of containers;
a relationship between a user and an individual container of the individual containers is determined based at least in part on a previous interaction between the user and the individual container;
the individual cards are arranged on the user interface in an order determined based at least in part on respective relevancies of the individual containers to the user, wherein individual relevancies of the individual containers are based at least in part on the relationship between the user and the individual container, wherein determining an individual relevancy of the respective relevancies includes:
determining a timestamp associated with the previous interaction;
determining a weight associated with the relationship based at least in part on the timestamp and a type of action associated with the previous interaction; and
determining the individual relevancy based at least in part on the weight; and a presentation of an individual card of the individual cards is based at least in part on a type of a corresponding individual container of the individual containers; and causing the user interface to be presented via a device associated with the user.

2. A system as claim 1 recites, the operations further comprising:

accessing data associated with interactions between a plurality of users, a plurality of containers, and a plurality of container elements;

determining, based at least in part on the data, relationships between the user and the plurality of containers; and determining the group of containers from the plurality of containers based at least in part on the relationships and the respective relevancies.

3. A system as claim 1 recites, wherein the weight decreases exponentially based at least in part on an amount of lapsed time.

4. A system as claim 1 recites, the operations further comprising causing the corresponding individual container to be presented via the device based at least in part on a user-selected action with respect to the individual card.

5. A system as claim 1 recites, wherein the individual card includes one or more interface elements, an interface element of the one or more interface elements corresponding to a container element associated with the corresponding individual container.

6. A system as claim 5 recites, the operations further comprising causing the container element to be presented via the device based at least in part on a user-selected action with respect to the interface element.

7. A system as claim 5 recites, wherein the one or more interface elements are arranged on the card based at least in part on a relevance between the container element and the user.

8. A system as claim 1 recites, wherein the user interface corresponds to a home page of a collaborative computing environment.

9. Computer storage media with instructions that, when executed by a processor, cause a user interface to be presented on a display of a device associated with a user, the user interface comprising:

a plurality of cards, a card of the plurality of cards corresponding to individual containers in a group of containers associated with a collaborative computing environment, a relationship between a user and an individual container of the individual containers determined based at least in part on a previous interaction between the user and the individual container, the card including one or more first interface elements corresponding to container elements associated with the individual container, wherein the plurality of cards are arranged on the user interface in an order determined based at least in part on respective relevancies of the individual containers to the user wherein individual relevancies of the individual containers are based at least in part on the relationship between the user and the individual container, wherein determining an individual relevancy of the respective relevancies includes:

determining a timestamp associated with the previous interaction;

determining a weight associated with the relationship based at least in part on the timestamp and a type of action associated with the previous interaction; and determining the individual relevancy based at least in part on the weight.

10. Computer storage media as claim 9 recites, wherein the plurality of cards are arranged in an order based at least in part on determined relevancies to the user.

11. Computer storage media as claim 9 recites, wherein the one or more first interface elements are arranged on the card based at least in part on determined relevancies to the user.

12. Computer storage media as claim 9 recites, wherein an interface element of the one or more first interface elements conveys an importance of a container element of the container elements based on indicating at least one of an action performed with respect to the container element, a second user who performed the action, and a timestamp associated with the action.

13. Computer storage media as claim 9 recites, wherein the card is associated with a direct link to the individual container.

14. Computer storage media as claim 9 recites, wherein each interface element of the one or more first interface elements is associated with a direct link to a corresponding container element.

15. Computer storage media as claim 9 recites, wherein the card further includes a second interface element indicating that the individual container is associated with at least one of a local server or remote server.

16. Computer storage media as claim 9 recites, wherein the card further includes a second interface element indicating that the individual container is a private container.

17. Computer storage media as claim 9 recites, wherein the card further includes at least one control configured to provide functionality based at least in part on a user-selected action with respect to the individual container.

18. Computer storage media as claim 9 recites, wherein at least one of a first size of the user interface, a second size of cards in the plurality of cards, a first number of cards in the plurality of cards, or a second number of the one or more first interface elements is scalable based at least in part on a third size of the display.

19. A method comprising:

accessing data associated with interactions between a plurality of users, a plurality of containers, and a plurality of container elements;

determining, based at least in part on the data, relationships between a user of the plurality of users and the plurality of containers;

determining at least two containers from the plurality of containers based at least in part on respective individual relevancies of the at least two containers to the user, wherein individual relevancies of the at least two containers are based at least in part on the relationships between the user and at least two containers, wherein determining an individual relevancy of the respective relevancies includes:

determining a time stamp associated with a previous interaction between the user and an individual container;

determining a weight associated with the relationship based at least in part on the timestamp and a type of action associated with the previous interaction; and determining the individual relevancy based at least in part on the weight; and generating a user interface including at least two first interface elements respectively corresponding to the at least two containers wherein:
  the at least two first interface elements are arranged on the user interface in an order determined based at least in part on the respective individual relevancies of the at least two containers to the user;
  a first interface element of the at least two first interface elements is associated with one or more second interface elements;
  each second interface element corresponds to a container element of the plurality of container elements associated with a container corresponding to the first interface element; and
  the one or more second interface elements are arranged on the first interface element based at least in part on respective relevancies of the plurality of container elements to the user.

\* \* \* \* \*